United States Patent
Campbell et al.

(10) Patent No.: US 7,502,754 B2
(45) Date of Patent: Mar. 10, 2009

(54) SECURE WEB SERVER SYSTEM FOR UNATTENDED REMOTE FILE AND MESSAGE TRANSFER

(75) Inventors: Eric Campbell, Rye, NH (US); Robert F Hoffman, Baldwin, NY (US); Robert Maloney, Jr., Massapequa Park, NY (US); Maris N Lemanis, Smithtown, NY (US); Andrew Mintzer, Fort Salonga, NY (US)

(73) Assignee: Bottomline Technologies (DE), Inc., Portsmouth, NH (US)

( * ) Notice: Subject to any disclaimer, the term of this patent is extended or adjusted under 35 U.S.C. 154(b) by 947 days.

(21) Appl. No.: 10/979,045

(22) Filed: Nov. 1, 2004

(65) Prior Publication Data

US 2005/0086298 A1 Apr. 21, 2005

Related U.S. Application Data

(63) Continuation-in-part of application No. 10/879,233, filed on Jun. 29, 2004, and a continuation-in-part of application No. 10/139,596, filed on May 6, 2002, and a continuation-in-part of application No. 10/041,513, filed on Jan. 8, 2002, now abandoned.

(51) Int. Cl.
*G06Q 40/00* (2006.01)

(52) U.S. Cl. .......... 705/35; 709/227; 709/228; 709/229; 380/255; 380/277

(58) Field of Classification Search ............ 705/35, 705/37, 44; 380/278, 44, 30; 709/201, 202, 709/203
See application file for complete search history.

(56) References Cited

U.S. PATENT DOCUMENTS 5,689,565 A * 11/1997 Spies et al. ............... 713/189
6,052,785 A * 4/2000 Lin et al. ..................... 726/5
6,104,798 A * 8/2000 Lickiss et al. ......... 379/201.12

OTHER PUBLICATIONS

Secure File Transfer While You Sleep—No Longer Just a Dream; New VanDyke Release Makes Unattended Secure File Transfers a Reality, PR Newswire, New York: Dec. 20, 2001. p. 1.*

* cited by examiner

*Primary Examiner*—Mary Cheung
*Assistant Examiner*—Brian Fertig
(74) *Attorney, Agent, or Firm*—Timothy P O Hagan

(57) ABSTRACT

A system provides for the secure exchanging files with a remote transfer server over an open network such as the Internet. The system comprises a database with file transfer tables, a hypertext transport protocol (HTTP) server, and a web services server. The HTTP server is coupled to the database and provides web pages to an HTTP client to obtain file transfer event parameters and identification of a remote file transfer client to which the file transfer event parameters are associated. The file transfer event parameters are stored in the file transfer tables in association with the identification of the remote file transfer client. The web services server comprising a plurality of transfer methods. The transfer methods comprises: i) a method for associating a remote transfer client with a session ID; ii) a method for providing to the remote transfer client the file transfer event parameters that are associated with the remote transfer client in response to receiving a method call from the remote transfer client; and iii) a method call for executing a file exchange with the remote transfer client in response to receiving a method call from the remote transfer client that includes the file transfer parameters.

4 Claims, 21 Drawing Sheets

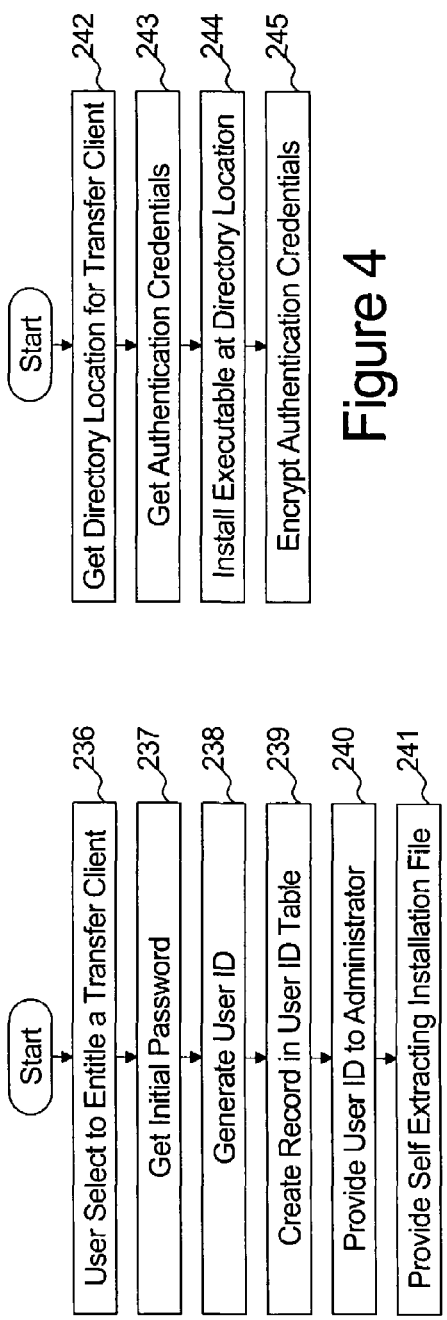

Event Parameter Table 312

| Event Key 315 | Parameter ID 321 | Parameter Value 322 |
|---|---|---|
| Event Key Value 80 | | |
| | | |
| | | |
| | | |
| | | |
| | | |

Figure 7b

Event Key Table 311

| Index 360 | Transfer Client ID 362 | | Event Key 315 |
|---|---|---|---|
| | Group ID 354 | User ID 356 | |
| | Group ID 71 | User ID 72 | Event Key Value 80 |
| | | | |
| | | | |
| | | | |
| | | | |
| | | | |

| Event Parameter Table 312 | | |
|---|---|---|
| Event Key 315 | Parameter ID 321 | Parameter Value 322 |
| | File Name 342 | |
| | Download Directory Path 343 | |
| | Event Type 344 | |
| | BLOB Generation 345 | |
| | Profile ID 347 | |
| | Extract Rules 349 | |
| | Class 351 | |
| | Offset 353 | |
| | Status 355 | |
| | Printer 352 | |
| | Print Code 354 | |
| | Email Address 101 | |
| | Email Code 102 | |

Figure 7c

| Event Parameter Table 312 | | |
|---|---|---|
| Event Key 315 | Parameter ID 321 | Parameter Value 322 |
| 001 | File Name 323 | |
| 001 | Upload Directory Path 324 | |
| 001 | BLOB Handling 326 | |
| 001 | Destination Group ID 325 | |
| 001 | BLOB Loading Rules 327 | |
| 001 | Status 328 | |
| | Email Address 101 | |
| | Email Code 102 | |

| Email Codes 102 | |
|---|---|
| Code | Description |
| 01 | No Email Notification |
| 02 | Send on Success |
| 03 | Send on Failure |
| 04 | Send on Success or Failure |

Figure 8

| Available Printers 318 | | | |
|---|---|---|---|
| Index | Group ID 354 | User ID 356 | Printer ID 378 |
| | | | Printer ID 81 |
| | | | |
| | | | |
| | | | |

Figure 9

| Transfer Methods 51 | Parameters |
|---|---|
| Create Symetrical Key | User Group, User ID, T.C. Public |
| Log-On | User Group, User ID, Password |
| Heart Beat | Session ID |
| Change Password | Session ID, Old Password, New Password |
| Retrieve Active Event Keys | Session ID |
| Send Printers | Session ID, Printers IDs |
| Read Event | Session ID, Event Key |
| Update Event | Session ID, Event Key, Status Information, Offset |
| Create BLOB | Session ID, Profile ID, Extract Rules |
| Check for Available BLOB | Session ID, Class, Offset |
| Download BLOB | Session ID, BLOB ID |
| Upload File | Session ID, File Name, BLOB Contents |
| Set Destination BLOB Owner | Session ID, BLOB ID, User Group |
| Process BLOB | Session ID, BLOB ID, Loading Rules |

Figure 10

(Log On)

(Create Symetrical Key)

(Retrieve Active Event Keys)

(Change Password)

(Update Event)

(Send Printers)

(Read Event)

(Download BLOB)

(Check for Available BLOB)

(Create BLOB)

(Process BLOB)

(Set Destination BLOB Owner)

(Upload File)

| Local Processes 23 | | |
|---|---|---|
| Index | Process | Parameters |
| 1 | Create Symetrical Key | User Group, User ID |
| 2 | Log-On | User Group, User ID |
| 3 | Heart Beat | Session ID |
| 4 | Change Password | Session ID |
| 5 | Send Printers | Session ID, Printers IDs |
| 6 | Retrieve Active Event Keys | Session ID |
| 7 | Read Event | Session ID, Event Key |
| 8 | Update Event | Session ID, Event Key, Status Information, Offset |
| 9 | Create BLOB | Session ID, Profile ID, Extract Rules |
| 10 | Check for Available BLOB | Session ID, Class, Offset |
| 11 | Download BLOB | Session ID, BLOB ID |
| 12 | Upload File | Session ID, File Name, BLOB Contents |
| 13 | Set Destination BLOB Owner | Session ID, User Group |
| 14 | Process BLOB | Session ID, BLOB ID, Loding Rules |
| 15 | Save Password | Password |
| 16 | Create and Write File | File Name |
| 17 | Read File | File Name |
| 18 | Send to Printer | Printer ID, File Name |
| 19 | Rename File | Old File Name, New File Name |

Figure 15

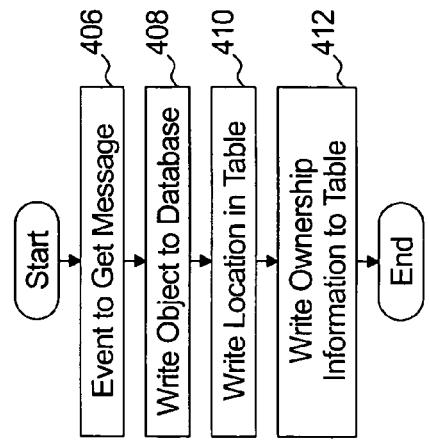
Figure 20
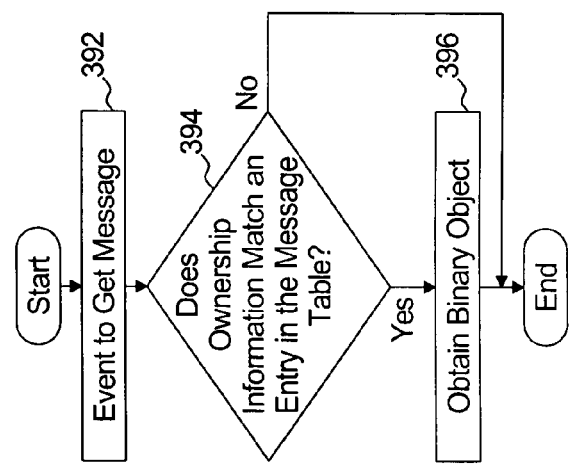
Figure 21a
Figure 21b

SECURE WEB SERVER SYSTEM FOR UNATTENDED REMOTE FILE AND MESSAGE TRANSFER

CROSS REFERENCE TO RELATED APPLICATIONS

The present application is a continuation in part of U.S. patent application Ser. No. 10/879,233 entitled A Transfer Server of a Secure System for Unattended Remote File and Remote Message Transfer filed on Jun. 29, 2004 and is a continuation in part of U.S. patent application Ser. No. 10/041,513 entitled Automated Invoice Receipt and Management System with Field Value Substitution filed on Jan. 8, 2003 now abandoned and is a continuation in part of U.S. patent application Ser. No. 10/139,596 entitled Automated Invoice Receipt and Management System with Automated Loading Systems filed on May 6, 2002.

TECHNICAL FIELD

The present invention relates to the exchange of data files over an open network, and more particularly, to a secure web services system and method for the automated exchange of data files between data processing systems over the Internet.

BACKGROUND OF THE INVENTION

Database systems have long been used by businesses to record their commercial interactions with customers, vendors, financial institutions, and other third parties. Most database applications are transaction based—meaning that the application obtains all required data for a particular transaction before the transaction is written to the database.

Since the early days of database systems, it has long been a goal to automate the transfer of data between the business's computer systems and those of the other third parties. Early methods of transferring data between database systems included exporting data (in accordance with a defined report) from a first system onto a magnetic tape or other data media. The data media is then physically transferred to a second system. While such a system was an improvement over manual entry of data, several draw backs existed. First, physical transfer of the data media could take a significant amount of time if mail or courier was used. Secondly, the three steps of writing the data file to the data media, transferring the data media, and loading the data file from the data media all required human intervention to be properly performed. Thirdly, both the application on the first system and the application on the second system had to be compatible—or, stated another way, the data file written to the data media by the first system had to be in a format that could be read and loaded into the second system.

Development of modems, value added networks (VAN), and Internet networking in general significantly improved the data transfer process. Rather than physically transferring a data file on magnetic tape or other data media, the data file could be transferred using a dial up connection between the two computer systems, a VAN connection, or an Internet connection.

Using a dial up connection, a modem associated with the first system could dial and establish a PSTN telephone line connection with a modem associated with the second system. A user would be able to export the data file from the first system, transfer the data file to the second system over the PSTN connection, and a user of the second system could load the data file into the second system.

A VAN connection is quite similar to a dial-up connection with the exception that the PSTN connection is continually maintained (e.g. a leased line) for security. Transfer of a data file between the first system and the second system over a VAN may include the user of the first system exporting the data file, transferring the data file to the second computer system over the VAN, and a user of the second system loading the data file into the second system.

Subsequent development of the Internet and secure file transfer systems such as the Secure File Transfer Protocol (SFTP) has obsolete dial up connection and VAN technology for most data transfer application. Utilizing Internet and SFTP technology, the user of the first computer system would export the data file, log onto the SFTP server (that is networked to the second computer system), and upload the file to the SFTP server. The user of the second computer system would then retrieve the file from the SFTP server and load the file into the second computer system.

While transferring of files using dial up connections, VAN connections, and FTP file transfer are a significant improvement over use of magnetic media for transferring a data file, the two systems must still be compatible and human intervention is still required for the file transfer.

A separate filed of technology known as web services is being developed to support platform independent processing calls over the Internet. Web Services are data processing services (referred to as methods) which are offered by a servicing application to a requesting application operating on a remote system.

The system offering the web services to requesting systems publishes a Web Service Description Language (WSDL) document which is an Extensible Markup Language (XML) document that describes the web service and is compliant with the Web Services Description Language (WSDL) protocol. The description of the web service may include the name of the web service, the task that it performs, the URL to which the method request may be sent, and the XML structure and parameters required in a method request.

To obtain a published service, the requesting application sends a method call to the system as a Simple Object Access Protocol (SOAP) message within an HTTP wrapper. The SOAP message includes an XML method call which conforms to the required structure and parameters. So long as each system can build and interpret the XDML data within the SOAP message within the HTTP wrapper, no compatibility between the two systems is required.

Web services enable applications to be written which request data from the web service providers. For example, a web server which provides stock quotes may publish the structure and parameters for requesting a stock quote, the method call may be required to include the ticker symbol corresponding to the requested quote. The web server system which provides the information to the requesting application in response to receiving a method call for a method which the web service systems publishes as available.

Web service systems are optimized for unattended transferring of XML method calls and responses between a system and a web service provider. However, data transfer between a database system of a business and its third parties still is typically performed by exporting a transaction file, transferring the transaction file, and loading the transaction file at the second system—all steps that are facilitated by human intervention.

At the most general level, what is needed is a solution that enables unattended transfer of files over an open network,, such as the Internet, between two unattended applications, each operating on remote and secure network systems. More specifically, what is needed is a solution that enables unattended transfer of files over an open network that does not suffer the difficulties and complications that would be encountered if attempting to configure and operate known Internet FTP systems.

SUMMARY OF THE INVENTION

A first aspect of the present invention is to provide a system for the secure exchanging files with a remote transfer client over an open network such as the Internet.

The system comprises an HTTP web server, a web services server, and a data base comprising file transfer tables.

The HTTP web server is coupled to the database and provides HTML or XML web pages to an HTTP client, such as a web browser, to obtain user input of: i) file transfer event parameters defining each of a plurality of file exchange events; and ii) identification of a remote file transfer client to which the file transfer event parameters are associated. The file transfer event parameters are stored in association with identification of the remote file transfer client in the file transfer tables.

The web services server comprises a plurality of file transfer methods available to remote file transfer clients making method calls thereto. The file transfer methods include an event definition method and a plurality of file exchange methods.

The event definition method operates in response to receiving a method call from the remote transfer client and provides to the remote transfer client the file transfer event parameters that are associated with the remote transfer client in the file transfer tables.

Each of the plurality of file exchange method calls operates in response to receiving an applicable method call from the remote transfer client that includes the file transfer parameters that define a file exchange event and executes the file exchange event (defined by the file transfer parameters) with the remote transfer client. The file exchange events may be upload events and download events.

For purposes of improving security, the web services server may further comprise a symmetrical key definition method and a session ID method.

The symmetrical key definition method operates in response to receiving a create key method call from the remote transfer client that includes: i) a client public encryption key of a client public/private key pair generated by the remote transfer client and ii) identification of the remote transfer client. If the identification of the remote transfer client indicates that the remote transfer client is active, the symmetrical key definition method: i) calculates a symmetrical encryption key for use with a predetermined symmetrical encryption algorithm from the client public encryption key and a server private encryption key of a server public private key pair for use with the predetermined symmetrical encryption algorithm; and ii) returns the server public key to the remote transfer client.

The server public key may be returned to the remote transfer client packaged as a message encrypted using the predetermined symmetrical encryption algorithm and the client public encryption key.

In more detail, the symmetrical encryption key comprises both: i) the remainder of the server private encryption key raised to the power of the client public encryption key, divided by a predetermined prime integer; and ii) the remainder of the client private encryption key raised to the power of the server public encryption key, divided by the predetermined prime integer. The server private encryption key is an integer value generated by the web services server and the server public encryption key is the remainder of a predetermined generator value raised to the power of the server private encryption key, divided by the predetermined prime integer. Similarly, the client private encryption key is an integer value generated by the remote transfer client and the client public encryption key is the remainder of the predetermined generator value raised to the power of the client private encryption key, divided by the predetermined prime integer.

The session ID method (e.g. log-on method) operates in response to receiving a session ID method call that includes authentication credentials (e.g. group ID, user ID, and password) of the remote transfer client. The method call may be embodied in a message that is encrypted using the symmetric encryption algorithm and the symmetric encryption key. The session ID method: i) assigns a session ID to a web services session with the remote transfer client only if the authentication credentials match those of a valid remote transfer client; ii) stores the session ID in association with identification of the remote transfer client in a user ID table; and iii) returns the session ID to the remote transfer client.

Following execution of the symmetrical key definition method and the session ID method, each method call from the remote transfer client includes the session ID and is packaged as a message encrypted using the predetermined symmetrical encryption algorithm and the symmetrical encryption key.

Similarly, each response to the remote transfer client is packaged as a message encrypted using the predetermined symmetrical encryption algorithm and the symmetrical encryption key.

For a better understanding of the present invention, together with other and further aspects thereof, reference is made to the following description, taken in conjunction with the accompanying drawings, and its scope will be pointed out in the appended claims.

BRIEF DESCRIPTION OF THE DRAWINGS

FIG. 2 is a flow chart representing exemplary operation of a configuration application in accordance with one embodiment of the present invention;

FIG. 3 is an exemplary User ID table in accordance with one embodiment of the present invention;

FIG. 4 is a flow chart representing exemplary operation of an installation client in accordance with one embodiment of the present invention;

FIG. 7a is table representing an exemplary event key table in accordance with one embodiment of the present invention;

FIGS. 7b-7d are tables representing an exemplary event parameter table in accordance with one embodiment of the present invention;

FIG. 8 is a table representing exemplary email codes in accordance with one embodiment of the present invention;

FIG. 9 is a diagram representing an exemplary available printers table in accordance with one embodiment of the present invention;

FIG. 10 is a table representing exemplary transfer methods operated by the transfer server in accordance with one embodiment of the present invention;

FIG. 15 is a table representing exemplary local processes operated by the transfer client in accordance with one embodiment of the present invention;

FIG. 20 is a table representing an audit table in accordance with one embodiment of the present invention; and FIGS. 21a and 21b represent exemplary operation of a back end server application in accordance with one embodiment of the present invention.

DETAILED DESCRIPTION OF THE INVENTION

Figure 1:
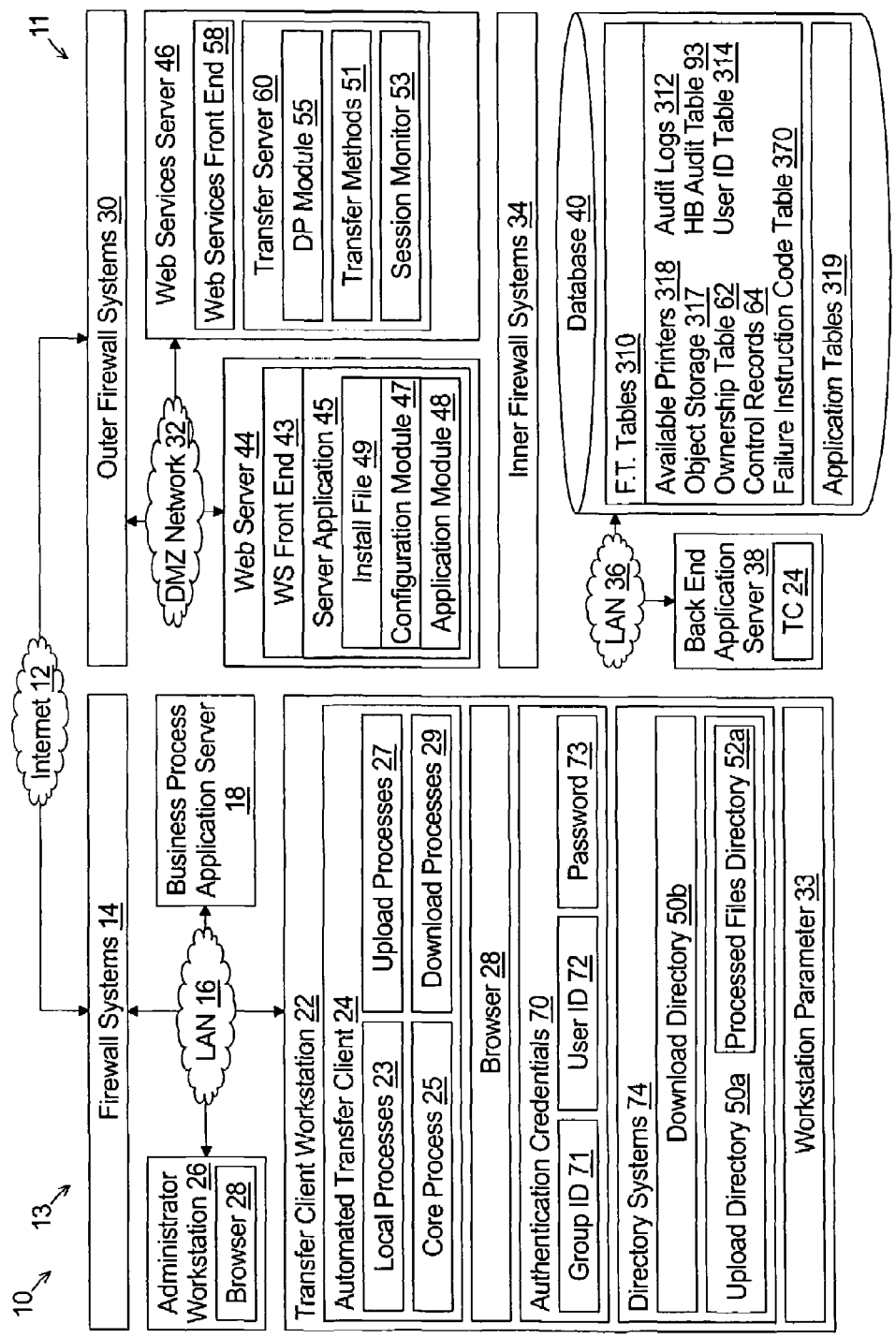
FIG. 1 is a block diagram of a system for secure and unattended file transfer in accordance with one embodiment of the present invention.

The present invention is now described in detail with reference to the drawings, in the drawings, each element with a reference number is similar to other elements with the same reference number independent of any letter designation following the reference number. In the text a reference number with a specific letter designation following the reference number refers to the specific element with the number and letter designation and a reference number without a specific letter designation refers to all elements with the same reference number independent of any letter designation following the reference number in the drawings.

It should also be appreciated that many of the elements discussed in this specification may be implemented in hardware circuit(s), a processor executing software code, or a combination of a hardware circuit and a processor executing code. As such, the term circuit as used throughout this specification is intended to encompass a hardware circuit (whether discrete elements or an integrated circuit block), a processor executing code, or a combination of a hardware circuit and a processor execution code, or other combinations of the above known to those skilled in the art.

FIG. 1 illustrates exemplary architecture of system for secure and unattended remote file transfer (e.g. the remote file transfer system 10) over an open network such as the Internet 12 in accordance with one embodiment of the present invention. The remote file transfer system 10 comprise at least one host system 11 and at least one client system 13—each of which is coupled to the Internet 12.

The client system 13 comprises an administrator workstation 26, a transfer client workstation 22, and at least one business process application server 18. Each of the administrator workstation 26, the transfer client workstation 22, and the business process application server 18, may be communicatively coupled by an IP compliant local area network 16. The local area network 16 may be coupled to the Internet 12 by firewall systems 14.

The administrator workstation 26 may be a known computer system with a known operating system (not shown), IP networking hardware and software (not shown), and a known secure hyptertext transport protocol (HTTP) client such as a web browser 28 for establishing an HTTPs session to a URL associated with a web server 44 of the host system 11 and enabling a user to navigate web pages provided by the web server 44.

The transfer client workstation 22 may also be a known computer system with an operating system (not shown) and IP networking hardware and software (not shown). The workstation 22 operates an unattended web services client application (e.g. transfer client 24). In general, the transfer client 24 uses authentication credentials 70 to authenticate itself to a web services server 46 of the host system 11 and establish a secure web service session therewith. Files are then transferred: i) from an upload directory 50a to the web services server 46; and ii) from the web services server 46 to a download director 50b.

For purposes of illustrating the present invention the upload directory 50a and a download directory 50b may be part of a directory system 74 which may be local or network drives available to each of the transfer client workstation 22 and the business process application server 18.

The authentication credentials 70 may include a group ID 71, a user ID 72, and password 73. The authentication credentials are stored in volatile memory in an encrypted format. Storage in volatile memory assures that the authorization credentials 70 are lost if the transfer client workstation 22 is powered down and intervention of an authorized user is required to re-authorize automated file transfer. The encryption uses an encryption key which is generated using workstation parameters 33 such as a network card ID, an IP address, or other value unique to the workstation 22 such that the encrypted representation of the authentication credentials cannot be deciphered on any other machine.

The business process application server 18 may operate a known database system or enterprise resource management (ERP) system for recording business process and financial transactions in a database (not shown). Further, (as will be discussed in more detail herein), the business process application server 18 may be configured for unattended exchange of files with the web services server 46 of the host system 11. More specifically the business process application server 18 is configured to: i) write data files which are intended for transfer to the web services server 46 to the predetermined upload directory 50a; and ii) retrieve data files expected from the web services server 46 from the predetermined download directory 50b.

The host system 11 comprises at least one web server 44, the web services server 46, a database 40, and (optionally) a back end application server 38.

In the exemplary embodiment, the web server 44 and the web services server 46 are coupled to an IP compliant network typically referred to as a DMZ network 32—which in turn is coupled to the Internet 12 by outer firewall systems 30 and coupled to an IP compliant local area network 36 by inner firewall systems 34. The web server 44 and the web services server 46 may be operated on the same hardware system within the DMZ. The database 40 and the back end application server 38 may be coupled to the local area network 36.

In general, the web server 44 includes a known web server front end 43 and a server application 45. The web server front end 43 establishes an HTTPS session with the remote workstation 22 upon the user directing the browser 28 to a URL associated with the web server 44.

The server application 45 may include an application module 48 and a configuration module 47. The application module 48, in combination with the web server front end 43, provide sequences of web pages to the remote browser 28 to enable a user to exchange business process and/or financial transaction data between the business process application server 18 and application tables 319 in the database 40 of the host system 11.

For example, if the business controlling the host system 11 is a financial institution, the application module 48 may provide a menu driven sequence of web pages which enable the user to obtain reports and implement transactions typically provided by systems known as "Treasury work stations". If the business controlling the host system 11 is a corporate entity providing goods or services, the application module 48 may provide menu driven sequences of web pages which enable the user to post invoices, adjust invoices, post payments, request credit memos, and exchange other business process and financial data between the two entities accounting and/or resource management systems.

The configuration module 47 in combination with the web server front end 43, provides sequences of web pages to the remote browser 28 to enable a user to configure authentication parameters and data transfer event parameters which drive the automated exchange of business process and/or financial transaction data between the transfer client 24 and the web services server 46.

The web services server 46 may comprise a web services front end 58 and a transfer server 60, which, in combination, provide data processing services to remote systems (and in particular transfer clients 24 operating on the transfer client workstations 22) making method calls thereto.

The transfer server 60 may, in combination with the web services front end 58, publish a WSDL document describing the data processing services (e.g. transfer methods 51) provided by the transfer server 60 and, upon receiving a method call from a remote system (such as the unattended web services transfer client 24), executes the applicable transfer method 51.

In general, the transfer methods 51 of the present invention (which will be discussed in more detail with reference to FIG. 10) enable the remote automated web services transfer client 24 to make method calls to the web services server 46 to: i) obtain transfer event parameters from the database 40 (as configured by a user using an HTTPS session between a browser 38 and the web server 44); and ii) using such transfer event parameters, execute sequences of transfer methods 51 which in the aggregate provide for: a) upload business process and/or financial transaction data from the business process application server 18 to the database 40; b) download business process and/or financial transaction data from the database 40 to the business process application server 18; and c) exchange files (or messages) with the back end application server 38.

Entitling Transfer Client, Installation, and Configuration

The configuration module 47 may be a menu driven application that, in combination with the web server front end 43, provides a menu driven sequence of web pages (through the HTTPS session) for: i) entitling a transfer client 24 (for download and installation on the transfer client workstation 22); ii) configuring the transfer client 24 to authenticate itself to, and establish a secure web services session with, the web services server 46; and iii) configuring authentication parameters and data transfer event parameters within file transfer tables 310 of the database 40 which drive the automated transfer of data files (e.g. upload events and download events) between the transfer client 24 and the web services server 46.

Turning to the flow chart of FIG. 2, exemplary steps performed by the configuration modules 47 for entitling a transfer client 24 and initially loading the transfer client 24 on a transfer client workstation 22 are shown.

After an HTTPS session has been established between the browser 28 of the transfer client workstation 22 and the server application 45 and after the authorized user has been appropriately authenticated, the web pages provided by the server application 45 may present a selectable menu choice to entitle a transfer client 24. Step 236 represents the authorized user selecting to entitle a transfer client 24.

Step 237 represents the configuration module 47 presenting an applicable web page to obtain administrative entry of an initial password. More specifically, the web page comprises code for prompting the user to enter an initial password 73 into a form and posting the password to the web server 44 using HTTP post protocols.

Step 238 then represents the configuration module 47 generating a user ID 72 for the transfer client 24 and step 239 represents creating a record in a user ID table 314 within the database 40.

Turning briefly to FIG. 3 in conjunction with FIG. 2, an exemplary user ID table 314 is shown. The user ID table 314 includes a plurality of records 352, each identified by a unique index 360 and each of which includes the authentication credentials of a transfer client 24 configured for periodic file transfer with the web services server 46. Each record comprises a transfer client ID 362 which may comprise a separate group ID field 354 and a user ID field 356 for string the group ID 71 and user ID 72 assigned to the transfer client 24 respectively. Additional fields include: i) a password field 358 for storing an encrypted representation of the then current password value 73 (e.g. the encrypted password 82) assigned to the transfer client 24, ii) a symmetrical key field 359 for storing a "shared secret" encryption key (e.g. Sym key 95) useful in combination with a predetermined symmetrical encryption algorithm for exchange of data between the transfer client 24 and the web services server 46 during a web services session; iii) a heart beat interval field 364 for storing a time interval 78 at which the transfer client 24 is to make periodic heart beat method calls to the web services server 46; iv) an alert instruction field 367 which identifies an email address or other notification address (e.g. notification address 79) to which notification is to be sent in the event that a transfer client 24 fails to make its scheduled heart beat method calls to the web services server 46; v) a session ID field 368 storing the most recent session ID 83 assigned to the transfer client 24; iv) a session life field 370 storing a session time 371 representing expiration of the then current session; v) a password life filed 372 storing a password time 373 representing expiration of the then current password; vi) an event change flag filed 374 storing a flag indicative of a change in the event parameter configuration associated with the transfer client 24; and vii) a status field 369 storing an "active" indicator if the transfer client 24 had been properly configured and authorized and storing an "inactive" indicator prior to authorization, if the transfer client 24 has failed to make its schedule heart beat method calls, or if a logon attempt has been made with an incorrect password. If the status field 369 is set "inactive", the web services server 46 may not establish a web services session with the transfer client 24 until an authorized user intervenes.

Returning to 239 of the flow chart of FIG. 2, writing a record to the user ID tables 314 comprises writing: i) the group ID 71 of the authorized user entitling the transfer client, ii) the user ID 72 generated by the configuration module 47 at step 238; and iii) the encrypted password 82 calculated from the password 73 obtained from the authorized user at step 237 to a new record 352 of the user ID table 314.

In the exemplary embodiment, the encrypted password 82 is generated using a symmetrical ciphering technique wherein the password 73 itself is the key for deciphering the encrypted password 82. As such, when a password 73 is provided by the transfer client 24, it may be used as a key for generating the encrypted password 82.

Step 240 represents providing a confirmation web page to the browser 28 which includes at least the user ID 72 generated by the configuration module 47 such that the authorized user has the group ID 71 (same as the group ID of the authorized user), the user ID 72 (provided in the confirmation document), and the password 73 (input by the authorized user).

Step 241 represents providing an executable self extracting installation file 49 to the transfer client workstation 22 which, when received by the transfer client workstation 22 launches installation components of the operating system to install the transfer client 24.

In the exemplary embodiment, the code for the transfer client 24 may be executable code or interpretable code conforming with Active X Protocols or virtual machine protocols such that the transfer client 24 operates within the operating system environment of the transfer client workstation 22 after installation.

At installation, certain parameters must be configured at the transfer client workstation 22 to enable the transfer client 24 to begin operating with the web services server 46. Turning briefly to FIG. 4 in conjunction with FIG. 1, exemplary operation of the installation file 49 is shown.

Step 242 represents obtaining user selection of a directory location for storing the executable transfer client 24 and step 243 represents obtain user input of the authentication credentials (group ID 71, user ID 72, and password 73) for the transfer client 24.

Step 244 represents installing the executable files of the transfer client 24 at the chosen directory locations and step 245 represents encrypting the authentication credentials 70 using the workstation parameters 33 for storage in volatile memory.

Configuration

In addition to entitling and installing the transfer client 24, the configuration module 47 also provides web pages which enable the user of a browser 28 of any workstation with TCP/IP connectivity to the web server 44 (for example the administrator workstation 26 or any workstation coupled to the Internet 12) to configure authentication parameters (e.g. heart beat interval, alert instructions, session life, and password life) and file transfer parameters which define operation of the transfer client 24.

Figure 5:
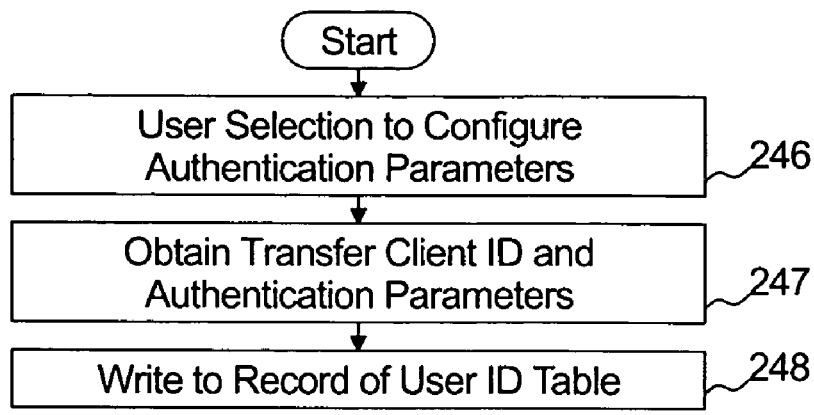
FIG. 5 is a flow chart representing exemplary operation of a configuration module for enabling an authorized user to configure authentication parameters in accordance with one embodiment of the present invention.
Figure 6:
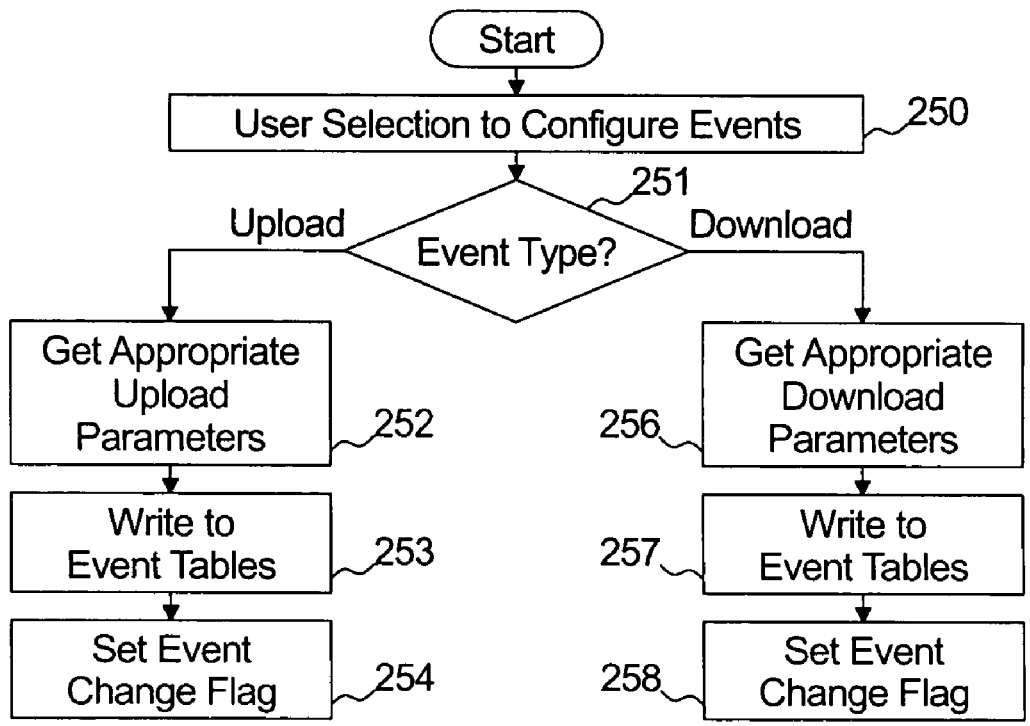
FIG. 6 is a flow chart representing exemplary operation of a configuration module for enabling an authorized user to configure events in accordance with one embodiment of the present invention.

The flow chart of FIG. 5 represents exemplary steps performed by the configuration module 47 to enable an authorized user to configure authentication parameters and the flow chart of FIG. 6 represents exemplary steps performed by the configuration module 47 to enable an authorized user to configure file transfer event parameters. It should be appreciated that these configuration steps may be performed initially upon entitling the client 24 and may be updated at times thereafter when appropriate.

Turning to FIG. 5 in conjunction with FIG. 1, the authorized user initiates configuration of authentication parameters by directing the browser 28 to an applicable URL of the web server 44 and, after receiving applicable menu web pages, selects a menu choice associated with authentication parameter configuration. Step 246 represents the configuration module 47 receiving administrator selection of a menu choice to configure authentication parameters of a transfer client 24.

Step 247 represents providing web pages for: i) administrator identification of a transfer client 24 (by its group ID 71 and user ID 72) and selection (or entry) of authentication parameters applicable to the identified transfer client 24; and ii) posting of such information to the configuration module 47.

Step 248 represents writing such authentication parameters to the record 352 of the user ID table 314 (FIG. 3) that corresponds to the identified transfer client 24. More specifically, the web pages enable the authorized user to provide: i) a time interval value 78 (typically one minute) for storage in the interval field 364 of the user ID table 314; ii) a notification address 79 for writing to the alert instruction field 367; iii) a session expiration interval useful for calculating a session life time 371 for writing to the session lief field 370; and iv) a password expiration interval useful for calculating a password life time 373 for writing to the password life field 372.

Turning to FIG. 6 in conjunction with FIG. 1, the authorized user initiates configuration of file transfer event parameters by directing the browser 28 to an applicable URL of the web server 44 and, after receiving applicable menu web pages, selects a menu choice associated with event configuration. Step 250 represents the configuration module 47 receiving administrator selection of a menu choice to configure events.

In the exemplary embodiment, the transfer client 24 obtains all if its instructions and parameters related to each upload event and each download event from the web services server 46. More specifically, the authorized user configures event parameters for each event within the automated file transfer tables 310 of the database 40 using a sequence of web pages provided by the configuration module 47 of the web server 44. The transfer client 24 retrieves such event parameters during the course of generating it periodic heart beat method calls to the web services server 46.

Turning briefly to FIGS. 7a and 7b, exemplary automated file transfer tables 310 include an event key tale 311 (FIG. 7a) and an event parameter table 316 (FIG. 7b).

The event key table 311 includes a plurality of records 313. Each record 313 associates an event with the group ID 71 and user ID 72 of transfer client 24 that is to execute the event. The event is identified by an event key value 80 stored in an event key field 315.

The event parameter table 316 includes a plurality of records 320. Each record includes an event key field 315, a parameter ID field 321, and a parameter value field 322. Each event parameter value is stored in a separate record 320 in the event parameter table 316 and is identified by an event parameter ID stored in the event parameter ID field 321. Both the parameter ID field 321 and the parameter value field 322 are text fields such that the information stored therein can be assembled as an XML file for providing to a transfer client 24 (Step 170 of FIG. 16 discussed herein). The event to which the parameter associates is identified by its event key value 80 stored in the event key field 315.

Returning to FIG. 6, the file transfer events can generally be defined as upload events and download events. The upload events comprise uploading a file as a "message" for retrieval by another transfer client 24 or the back end application server 38 (e.g. a message upload) or uploading a file for loading into the application tables 319 of the database 40 by the web services server 46 (e.g. a data upload). The download events comprise download of a file representing a "message" provided by another system (e.g. a message download) or the download of data extracted from the application tables 319 by the web services server 46 (e.g. a data download). Step 251 represents determining which event type is to be configured such that the configuration module 47 can provide appropriate web pages for boating user selection (or input) of the parameters required to drive the particular event.

Turning briefly to FIG. 7c in conjunction with FIG. 1, exemplary upload event parameters which may be associated an upload event include: i) a file name 323 identifying the name of the file to be uploaded; ii) an upload directory path 324 identifying the upload directory 50a in which the file is to be located; iii) a BLOB handling field 326 identifying whether the file, after uploading is to be left as a "message" for retrieval by another system or loaded by the web services server 46 into the application tables 319; iv) a destination group ID 325 identifying a destination group to receive the file after transfer to the web services server—if the file is to be left as a "message" for retrieval by another system identified by the destination group value; v) BLOB loading rules 327 identifying a local data processing function and parameters for calling such local data processing function for loading the file into the application table 319 if handling by the web services server is applicable; vi) a status parameter 328 identifying the then current status of the event (such as whether the event has started, the time started, the event is completed, the time completed, the event was aborted, or the time aborted); vii) an email address 101 identifying an address to which a notification email is to be sent; iv) an email code identifying conditions for sending the email notification;

Turning briefly to FIG. 8, exemplary email codes 102, as stored as records in an email codes table 102, include an email code 01 for no email notification (in which case the email address field 101 may be blank), an email code 02 for sending a notification email upon successful completion of the event; an email code 03 for sensing an email upon failure to successfully complete the event; and an email code 04 for sending an email upon either success completion of, or failure to successfully complete, the event.

Turning briefly to FIG. 7d in conjunction with FIG. 1, exemplary download event parameters which may be associated and download event include: i) a file name 342 which identifies the name of the file to be downloaded; ii) a download directory path parameter 343 which identifies the download directory 50b to which the file is to be written, iii) a BLOB generation parameter 345 which identifies whether the BLOB is to be generated by the data processing module 55 of the web services server 46 by reading data from the application table 319 (e.g. a data processing download event) or whether the BLOB is a file previously provided to the web services server 46 by another system (e.g. a messaging event);

iv) a profile ID 347 and extract rules 349 which are instructions for generating the BLOB based on data from the application tables 319 if the event is a data processing download event; v) a class 351 and offset 353 for identifying the BLOB in the ownership tables 62; vi) a status parameter identifying the then current status of the event (such as whether the event has started, the time started, the event is completed, the time completed, the event was aborted, or the time aborted); vii) an email address 101 identifying an address to which a notification email is to be sent; viii) an email code identifying conditions for sending the email notification; ix) a printer field 363; and x) a print code field 357. The print code field 357 stores and indication of whether a file should automatically be sent to a printer upon download. The printer field 363 identifies the specific printer to which the file should be sent.

Turning briefly to FIG. 9, the valuable printers table 318 includes a plurality of records 374. Each record associates a printer (identified by its printer ID value 81 in a printer ID field 378) with the group ID 354 and user ID 356 of a transfer client 24. As will be discussed, each transfer client 24 periodically updates the available printers table 318 such that an authorized user may configure download events in a manner that provides for the transfer client 24 to automatically send to the downloaded filed to an available printer.

Returning to the flow chart of FIG. 6, if at step 251 the event type is an upload event, steps 252 and 254 are performed and if the event type is a download event, steps 256 and 258 are performed.

Step 252 represents providing applicable web pages to the browser 28 to obtain user identification of a transfer client 24 to which the event is associated and input and/or selection of download event parameters necessary for populating the exemplary download event fields of FIG. 7d and post such values back to the web server 44. Step 253 represents creating applicable records in the event key table 311 of FIG. 7a and the event parameter tale 316 of FIGS. 7b through 7d. Step 254 represents setting the event change flag in the event change flag field 374 of the record 352 that corresponds to the transfer client 24 in the user ID table 314.

Step 256 represents providing applicable web pages to the browser 28 to obtain user identification of a transfer client 24 to which the event is associated and input and/or selection of upload event parameters necessary for populating the exemplary download event fields of FIG. 7c and post such values back to the web server 44. Step 257 represents creating applicable records in the event key table 311 of FIG. 7a and the event parameter table 316 of FIGS. 7b through 7d. Step 258 represents setting the event change flag in the event change flag field 374 of the record 352 that corresponds to the transfer client 24 in the user ID table 314.

Web Services Server

As discussed, the web services server 46 may comprise a web services front end 58 and a transfer server 60.

The web services front end 58 may be a known web services front end which utilizes the simple object access protocol (SOAP) for exchanging XML messages with remote systems (and in particular a transfer client 24 operating on the transfer client workstation 22) over the Internet 12.

The transfer server 60 may, in combination with the web services front end 58, publish a WSDL document describing the data processing services (e.g. transfer methods 51) provided by the transfer server 60 and, upon receiving a method call from a remote system, execute the applicable transfer method 51 and thereby provide the data processing service to the remote system making the method call.

The transfer methods 51 in the aggregate enable a remote unattended system making method calls to the web services server 46 to: i) perform functions similar to those performed by a user of a remote browser system using the application server module 45 of the web server 44; and ii) exchange files (or messages) with the back end application server 38.

More specifically with respect to performing functions similar to those performed by a user of a browser system using the application server module, the transfer methods 51 enable a remote system to: i) upload files to the web services server 46 and invoke automated handling of the file by a data processing module 55 of the transfer server 60—which writes data from the uploaded file to the application tables 319; and ii) invoke reading of data from the application tables 319 and creation of a file by the data processing module 55 for downloading to the remote system by the web services server 46.

More specifically, with respect to exchanging files with the back end application server 38, the methods 51 enable a remote system to: i) upload files to the transfer server 60 for storage as binary objects within object storage records 317 of the database 40—for subsequent retrieval by the applicable back end application server 38; and ii) download files or messages from the object storage records 317 which were previously provided to the web services server 46 by a back end application server 38.

Turning briefly to FIG. 10, an exemplary listing of the transfer methods 51 which are performed by the transfer server 60 are shown. These methods, in the aggregate, provide for the automated file transfer systems as discussed above. The steps executed to perform each transfer method 51 is discussed with respect to one of the flow charts of FIGS. 11a through 11n respectively and operation of the transfer client 24 in calling such methods to perform the file transfers is discussed later herein.

Create Symmetrical Key Method

Figure 11B:
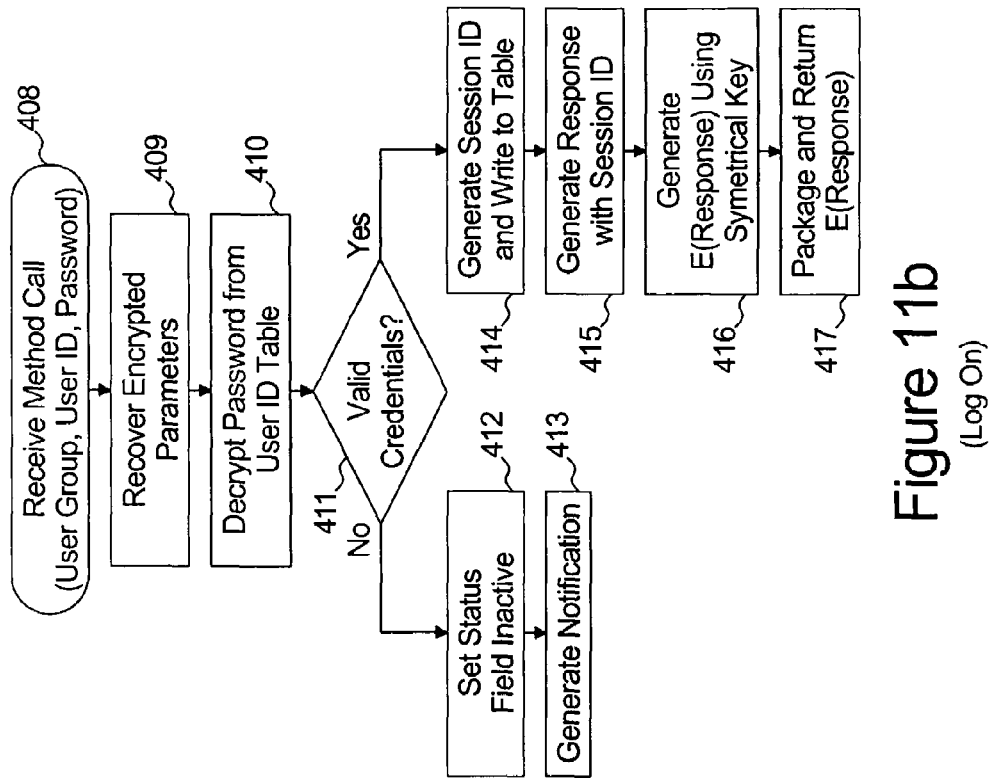
FIGS. 11a through 11n represent operation of an exemplary transfer method operated by the transfer server in accordance with one embodiment of the present invention.
Figure 11A:
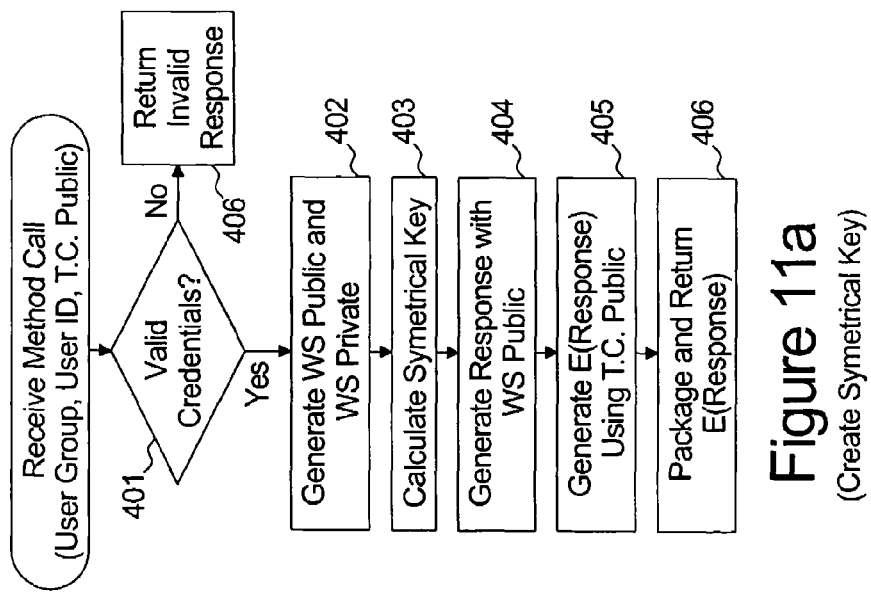

The flow chart of FIG. 11a represents a transfer method 51 called Create Key which is executed by the web services server 46 in response to receiving a Create Key method call from a transfer client 24. The Create Key method call includes parameters such as a group ID 71, a user ID 72, and a public encryption key (TC Public) of a public/private key pair generated by the transfer client for purposes of calculating a symmetrical encryption key which will become a shared secret key for the duration of the web services session.

Step 401 represents determining whether the group ID 71 and the user ID 72 match an active transfer client 24 in the User ID table 314 (FIG. 3)—or more specifically whether a record 352 associated with the group ID 71 and the user ID 72 match those of a transfer client 24 and whether the status field 369 of such record indicates that the transfer client 24 is active.

As will be discussed in more detail herein, if the value of the status field 369 represents that the transfer client 24 is inactive, the transfer client 24 either has not been authorized or has attempted to authenticate with an incorrect password. In either case, the transfer client 24 is not permitted to establish a web services session with the web services server 46 until such time as the value of the status field 369 has been returned to active. Therefore, if the transfer client does not exist in the user ID table 72 or is not active, a response indicating invalidity is returned at step 407.

If the transfer client 24 is active, at step 402, the web services server 46 generates a public/private encryption key pair (e.g. WS Public and WS Private) for use with a predetermined symmetrical encryption algorithm and, at step 403 calculates a symmetric key from the combination of WS Private and the TC Public for use with a predetermined symmetric encryption algorithm.

WS Public and WS Private are determined by generating a random integer value which is WS Private and deriving WS Public there from. WS Public is then calculated as the result of as:

$$WS\ Public = G^{(WS\ Private)} \bmod P.$$

The value of "G" is a predetermined integer value referred to as a generator and "P" is a predetermined large prime number—neither of which is secret.

TC Public was similarly calculated by the transfer client 24 using its on random number (TC Private) and the predetermined value of G and P. The Sym Key is calculated by the transfer server 60 executing the Create Symmetrical Key method as:

$$Sym\ Key = (TC\ Public)^{(WS\ Private)} \bmod P.$$

Step 404 represents generating an XML response message for return to the transfer client 24. The XML response message will include WS Public as a parameter to enable the transfer client 24 to calculate Sym Key using a corresponding algorithm wherein:

$$Sym\ Key = (WS\ Public)^{(TC\ Private)} \bmod P.$$

Step 405 represents encrypting the XML response message (including the WS Public value) using the predetermined symmetrical encryption algorithm and TC Public as the encryption key.

Step 406 represents packaging the encrypted XML response as a SOAP message and returning such SOAP message to the transfer client 24 making the processing call to the web services server 46.

Log-On method

The flow chart of FIG. 11b represents a transfer method 51 called Log-On which is executed by the web services server 46 in response to receiving a Log-On method call from a transfer client 24. The Log-On method call includes parameters such as the group ID 71, the user ID 72, and the then current password value 73. The parameters are part of the XML message comprising the processing call and are encrypted using the predetermined symmetrical encryption algorithm and the Sym Key.

Step 409 represents the web services server 46 using the symmetrical encryption algorithm and the Sym Key to decipher the XML processing call and recover the parameters.

Step 410 represents: i) retrieving the encrypted password value 82 from the record 352 of the user ID table 314 which corresponds to the group ID 71 and the user ID 72; and ii) decrypting the encrypted password value 82. As discussed, the encrypted password 82 is generated using a symmetrical ciphering technique wherein the password 73 itself is the key for deciphering the encrypted password 82. As such, when a password 73 is provided by the transfer client 24, it may be used as a key for deciphering the encrypted password 82. If the password 73 matches the deciphered value, then the password provided by the transfer client 24 matches the original password which was encrypted into the encrypted password 82 and stored in the user ID table 314.

Step 411 represents determining whether the password value 73 provided by the transfer client 24 matches the result of deciphering the encrypted password value 82. If there is a match, a Session ID 83 is generated and written to the Session ID field 368 of the user ID table 314 at step 414.

Step 415 represents generating an XML response message for return to the transfer client 24. The XML response message will include the Session ID 83 as a parameter.

Step 416 represents encrypting the XML response message (including the Session ID 83) using the predetermined symmetrical encryption algorithm Sym Key as the encryption key.

Step 417 represents packaging the encrypted XML response as a SOAP message and returning such SOAP message to the transfer client 24 making the processing call to the web services server 46.

Alternatively, if the password value 73 provided by the transfer client 24 does not match the result of deciphering the encrypted password 82 at decision box 411, the status field 369 of the record 352 is set to "inactive" at step 412 and notification is sent to the notification address 79 as stored in the alert instruction field 367 of the record 352 at step 413. In the exemplary embodiment, the notification address 79 will be an email address to which certain information about the failure is sent. The information may include the group ID 71 and the user ID 72.

Heart Beat Method

Figure 11C:
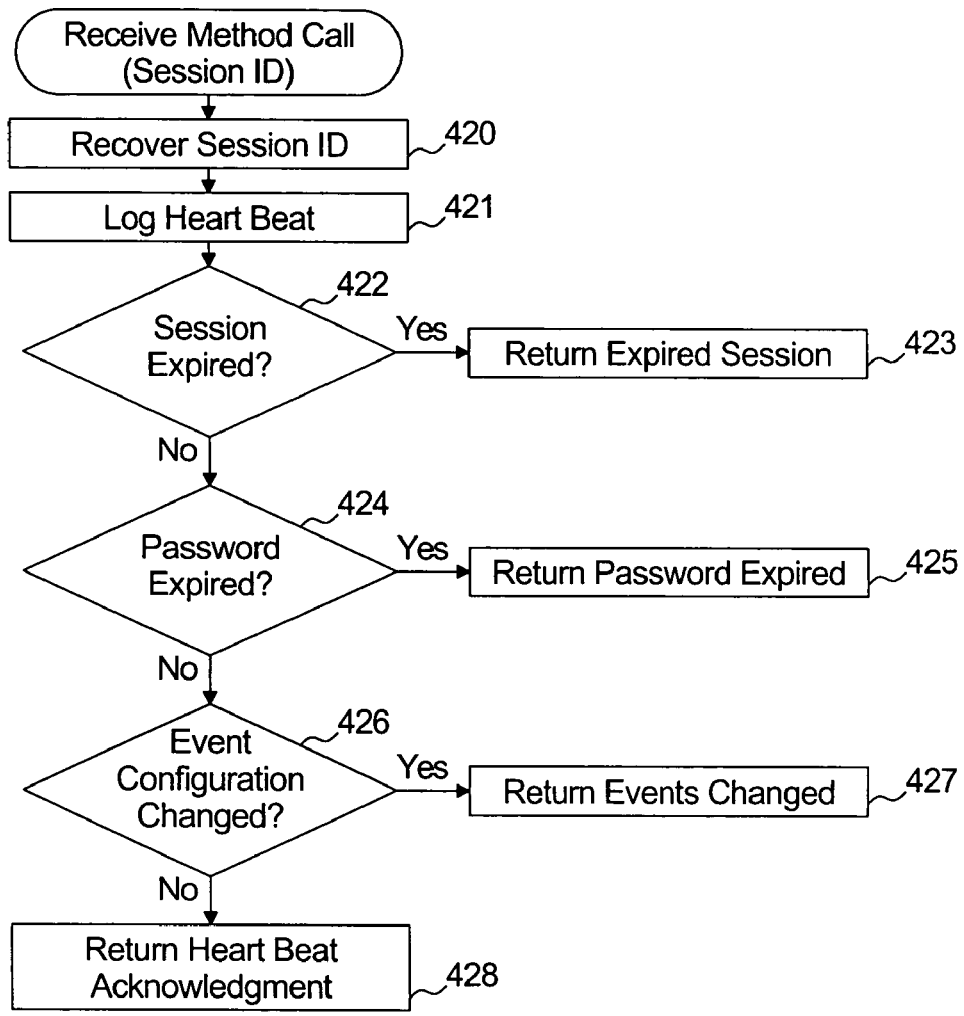

The flow chart of FIG. 11c represents a transfer method 51 called Heart Beat which is executed by the web services server 46 in response to receiving a Heart Beat method call from a transfer client 24. The Heart Beat method call is an XML message which includes the session ID as its parameter and which is encrypted using the predetermined symmetrical encryption algorithm and the Sym Key.

Step 420 represents the web services server 46 using the symmetrical encryption algorithm and the Sym Key to decipher the XML processing call and recover the Session ID.

Figures 12, 13, 14:
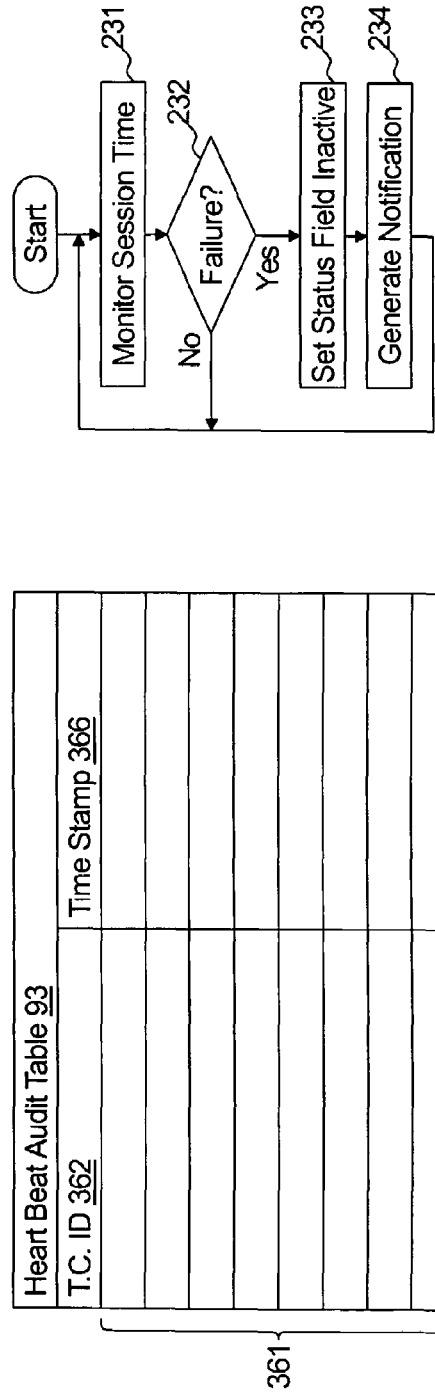
FIG. 12 is a table representing an exemplary heart beat audit table in accordance with one embodiment of the present invention.
FIG. 13 represents an ownership table in accordance with one embodiment of the present invention.
FIG. 14 represents an exemplary session ID monitoring process operated by the transfer server in accordance with one embodiment of the present invention.

Step 421 represents looking up the group ID and user ID which correspond to the session key and logging the heart beat in a heart beat audit table 93 as shown in FIG. 12. The heart beat audit table 93 comprises a plurality of records 361, each of which is written in response to receipt of a Heart Beat method call. The fields of each record include the transfer client ID 362 and a time value 366 representative of the time at which the heart beat method call is received. The heart beat audit table 93 is useful for determining when a transfer client 24 has failed to generate a heart beat method call and for enabling administrator review of heart beat method call activity.

Returning to FIG. 11c, decision box 422 represents determining whether the web services session has expired. More specifically, if the session has extended beyond the session time 371 as stored in the user ID table 314 (FIG. 2), the session has expired. If the web services session has expired, a response indicating an expired session is returned to the transfer client 24 at step 423. The response may be an XML message encrypted using the symmetrical encryption algorithm and the Sym Key and packages as a SOAP message. To interact with the web services server 46 after a session has expired, the transfer client 24 must establish a new session by executing a Create Symmetrical Key method call followed by a Log On method call.

If the session has not expired, decision box 424 is reached. Decision box 424 represents determining whether the password has expired. If the password has not been changed for a period of time extending beyond the password time 373 as stored in the user ID table 314 (FIG. 2), the password has expired. If the password is expired and a response indicating an expired session is returned to the transfer client 24 at step 425. The response may be an XML message encrypted using the symmetrical encryption algorithm and the Sym Key and packages as a SOAP message. To interact with the web services server 46 after a password has expired, the transfer client 24 must establish a new password using the Change Password method call discussed with respect to FIG. 11d.

If the session has not expired and the password has not expired, decision box 426 is reached. Decision box 426 represents determining whether the event configuration for the new event configuration exists for the transfer client 24. More specifically box 426 represents determining whether the event change field 374 of the record 352 of the user ID table 314 (FIG. 3) associated with the transfer client 24 has been set. As discussed, any update of the of a transfer client's event configuration by the web server 44 will set the event change flag.

If the event configuration for the transfer client 24 has changed, a response indicating events changed is returned to the transfer client at step 427. The response may be an XML message encrypted using the symmetrical encryption algorithm and the Sym Key and packages as a SOAP message. If the event configuration has changed, before further interaction with the web services server 46, the transfer client must update its local event tables to match the configured events.

If the session has not expired, the password has not expired, and configured events have not changed, the web services server 46 simply returns an acknowledgement to the Heart Beat method call at step 248. The response may be an XML message encrypted using the symmetrical encryption algorithm and the Sym Key and packaged as a SOAP message.

Change Password Method

Figure 11E:
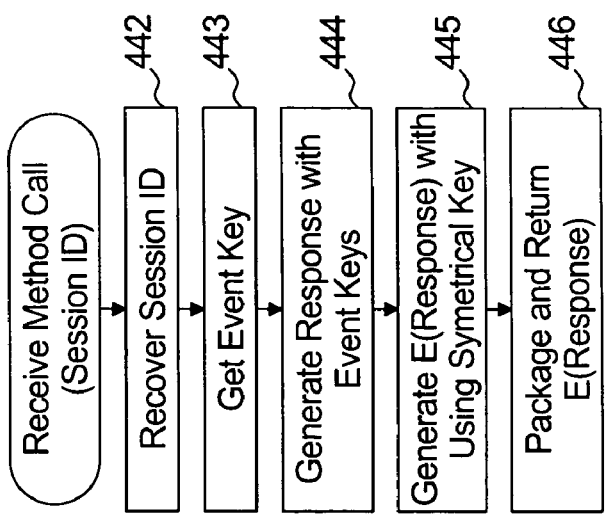
Figure 11D:
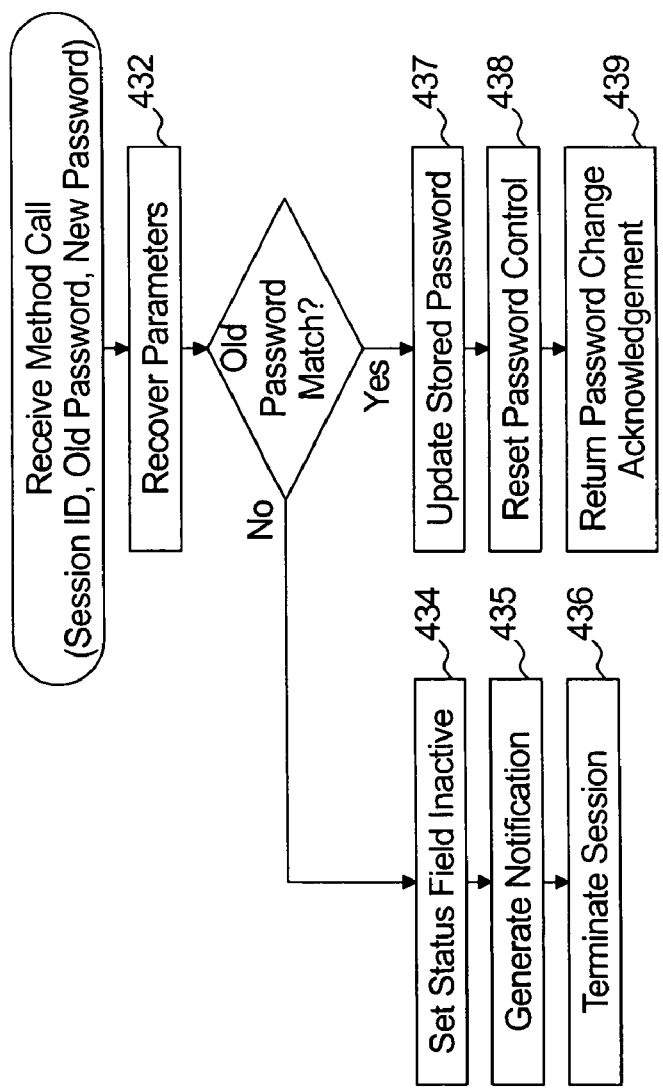

The flow chart of FIG. 11d represents a transfer method 51 called Change Password which is executed by the web services server 46 in response to receiving a Change Password method call from a transfer client 24. The Change Password method call is an XML message which includes as its parameters: i) the Session ID; ii) the existing password (e.g. old password); iii) a newly generated password (e.g. new password). The XML message is encrypted using the predetermined symmetrical encryption algorithm and the Sym Key.

Step 432 represents the web services server 46 using the symmetrical encryption algorithm and the Sym Key to decipher the XML method call and recover the Session ID, old password, and new password.

Step 433 represents deterring whether the old password matches the encrypted password value 82 stored in the User ID table 314. As discussed, the encrypted password value 82 is generated using a symmetrical ciphering technique wherein the password value itself is the key for deciphering the encrypted password value 82. As such, if the old password provided by the transfer client 24 deciphers the encrypted password value 82 to a value that is the old password, then the old password matches the encrypted password value 82 and the encrypted password value stored in the User ID table 314 is updated to an encrypted representation of the new password at step 437.

Step 438 represents resetting the password life value 373 such that the new password will expire within a predetermined period of time.

Step 439 represents returning a password change acknowledge to the transfer client 24. The response may be an XML message encrypted using the symmetrical encryption algorithm and the Sym Key and packages as a SOAP message.

If the old password does not match the result of deciphering the encrypted password 82 at decision box 433: i) the status field 369 of the record 352 is set to "inactive" at step 434; ii)

notification is sent to the notification address 79 as stored in the alert instruction field 367 of the record 352 at step 435; and iii) the session is terminated at step 436.

Retrieve Active Event Keys Method

The flow chart of FIG. 11*e* represents a transfer method 51 called Retrieve Active Event Keys which is executed by the web services server 46 in response to receiving a Retrieve Active Events Keys method call from a transfer client 24. The Retrieve Active Event Keys method call is an XML message which includes the session ID as its parameter. The XML message is encrypted using the predetermined symmetrical encryption algorithm and the Sym Key.

Step 442 represents the web services server 46 using the symmetrical encryption algorithm and the Sym Key to decipher the XML method call and recover the Session ID.

Step 444 represents the web services server 46: i) retrieving the group ID 71 and the user ID 72 associated with the Session ID 83 from the User ID table 314; ii) retrieving each Event Key value 80 associated with the group ID 71 and the user ID 72 in the event key table 311 (FIG. 7*a*); and iii) generating an XML response message that includes the event keys associated with the transfer client 24.

Step 445 represents encryption the XML response message (including the event keys) using the predetermined symmetrical encryption algorithm TC Private as the encryption key and step 446 represents packaging the encrypted XML response as a SOAP message and returning such SOAP message to the transfer client 24.

Read Event Method

Figure 11H:
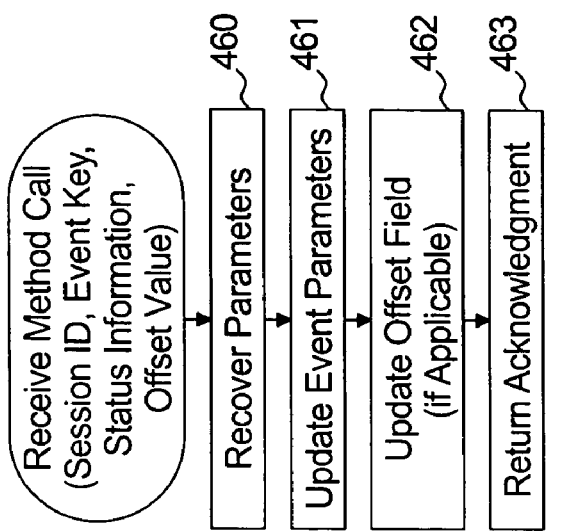
Figure 11G:
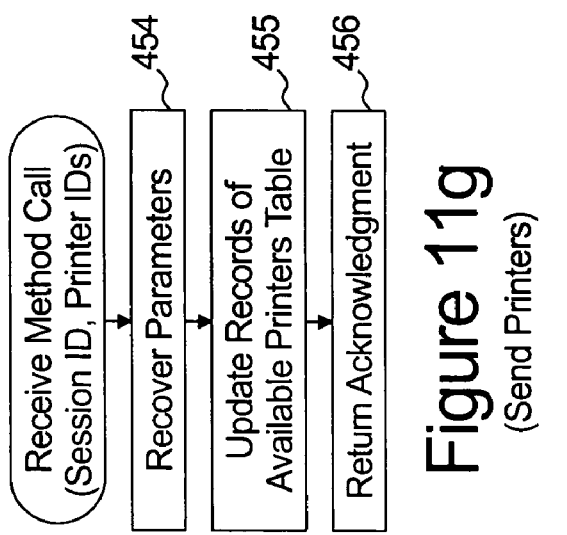
Figure 11F:
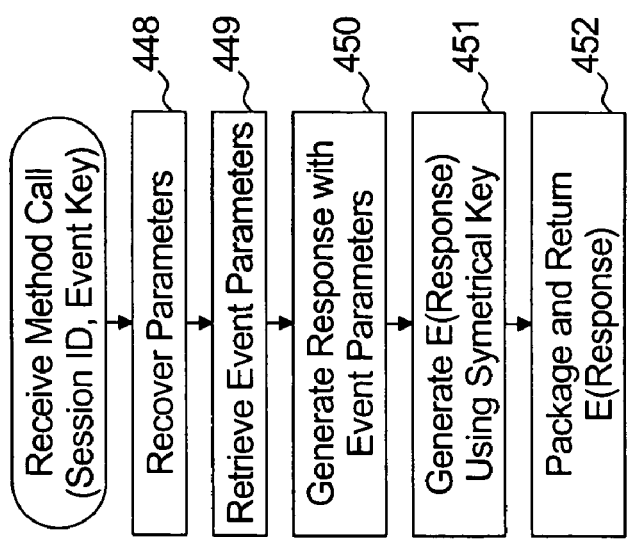

The flow chart of FIG. 11*f* represents a transfer method 51 called Read Event which is executed by the web services server 46 in response to receiving a Read Event method call from a transfer client 24. The Read Event method call is an XML message which includes the session ID and an event key as its parameters. The XML message is encrypted using the predetermined symmetrical encryption algorithm and the Sym Key.

Step 448 represents the web services server 46 using the symmetrical encryption algorithm and the Sym Key to decipher the XML method call and recover the Session ID.

Step 449 represents retrieving the event parameters (e.g. each parameter ID and its associated parameter value) associated with the event on the event parameter table 316 (FIG. 5*b*) and step 450 represents generating an XML response message that includes such event parameters.

Step 451 represents encrypting the XML response message (including the event keys) using the predetermined symmetrical encryption algorithm TC Private as the encryption key and step 452 represents packaging the encrypted XML response as a SOAP message and returning such SOAP message to the transfer client 24.

Send Printers Method

The flow chart of FIG. 11*g* represents a transfer method 51 called Send Printers which is executed by the web services server 46 in response to receiving a Send Printers method call from a transfer client 24. The Send Printers method call is an XML message which includes the session ID and the printer ID of each local printer available to the transfer client workstation 22 as its parameters. The XML message is encrypted using the predetermined symmetrical encryption algorithm and the Sym Key.

Step 454 represents the web services server 46 using the symmetrical encryption algorithm and the Sym Key to decipher the XML method call and recover the Session ID and printer ID values.

Step 455 represents updating the records 374 of the available printers table 318 to reflect printers then currently available to the transfer client workstation 22.

Step 456 represents returning a printer update acknowledgement to the transfer client 24. The acknowledgement may be an XML message encrypted using the symmetrical encryption algorithm and the Sym Key and packages as a SOAP message.

Update Events Method

The flow chart of FIG. 11*h* represents a transfer method 51 called Update Event which is executed by the web services server 46 in response to receiving a Update Event method call from a transfer client 24. The Update Events method call is an XML message which includes as its parameters: i) the session ID; ii) an event key; iii) status information; and iv) an offset value. The XML message is encrypted using the predetermined symmetrical encryption algorithm and the Sym Key.

Step 460 represents the web services server 46 using the symmetrical encryption algorithm and the Sym Key to decipher the XML method call and recover the Session ID, event key, status information, and offset value.

In the exemplary embodiment, the status information may be identification of a parameters ID 321 and a parameter value 422 for storage in the event parameter table 316. It is useful for the transfer client 24 to be able to update parameter values during execution of an event to reflect the processes performed. The offset value is a value representing an increment such that the number of time that an event has been processed can be tracked. This is useful for avoiding duplicate upload events, download events, or gateway events for the same file.

Step 461 represents updating the event parameter table 316 as applicable to reflect the status information provided in the Update Event method call.

Step 462 represents updating the offset value as stored in the event parameter table 316 to reflect the Offset Value provided in the Update Event method call.

Step 463 represents returning an event update acknowledgement to the transfer client 24. The acknowledgement may be an XML message encrypted using the symmetrical encryption algorithm and the Sym Key and packaged as a SOAP message.

Create BLOB Method

Figure 11K:
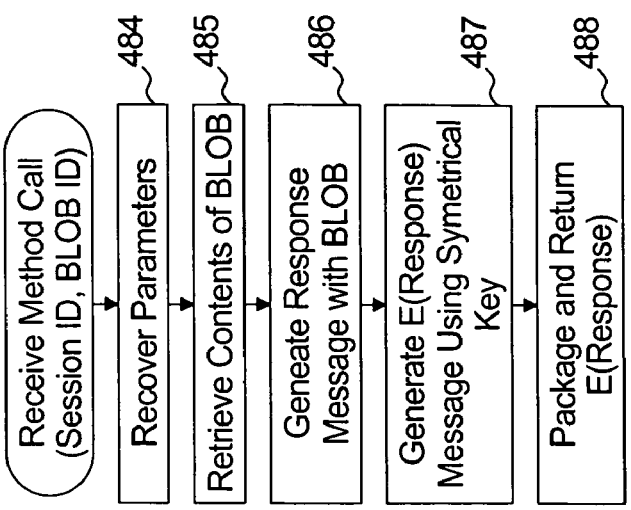
Figure 11J:
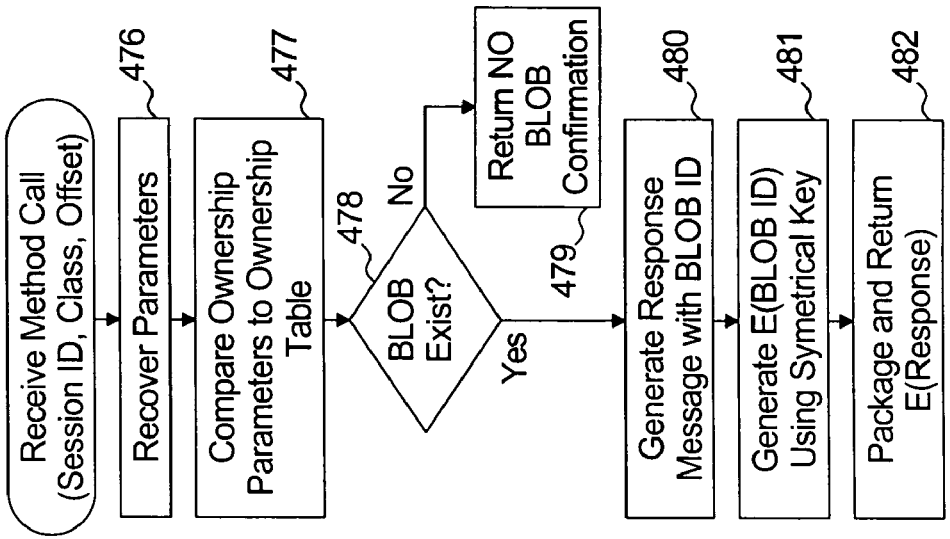
Figure 11I:
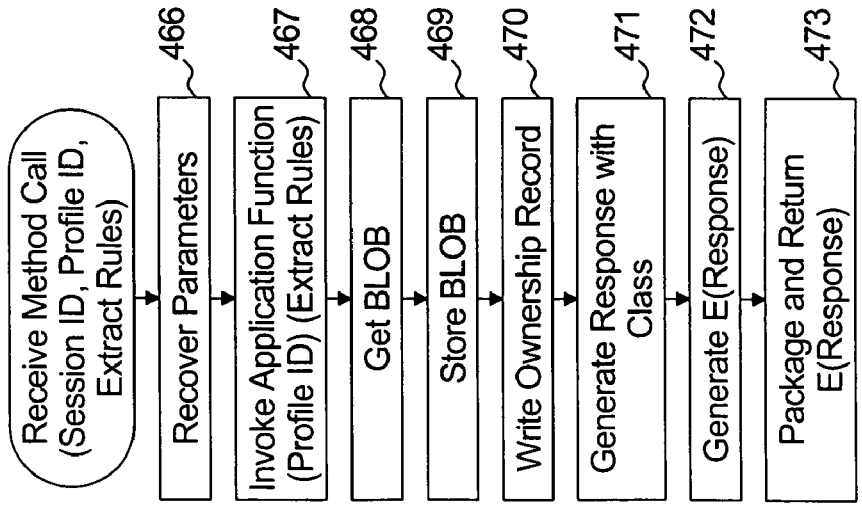

The flow chart of FIG. 11*i* represents a transfer method 51 called Create BLOB method which is executed by the web services server 46 in response to receiving a Create BLOB method call from a transfer client 24. The Create BLOB method call is an XML message which includes as its parameters: i) the session ID; ii) a profile ID; and iii) extract rules. The XML message is encrypted using the predetermined symmetrical encryption algorithm and the Sym Key.

Step 466 represents the web services server 46 using the symmetrical encryption algorithm and the Sym Key to decipher the XML method call and recover the Session ID, profile ID, and extract rules.

Step 467 represents involving a local function (e.g. a function executed by the data processing module 55 of the transfer server 60) which corresponds to the to the profile ID 347 to retrieve applicable data from the application tables 319 and providing the extract rules 349 to a file building system which formats the retrieved data in a file format compatible with (e.g. for loading into) the business process application server 18. For example, in a balance and transaction reporting system, the profile ID 347 may indicate a data processing method and a group of parameters which result in the data processing module retrieving today's balance values for a certain group of accounts from the application tables 319. The extract rules 349 may identify to the file building system that the balances and associated data retrieved from the application tables should be formatted as a particular type of EDI file recognizable by the business process application server 18.

Step 468 represent obtaining the BLOB from the data processing module 55 and step 469 represents writing the BLOB to the object storage 317, step 470 represents creating an ownership record 63 in an ownership table 62 and populating each of the fields for which a value is available, and step 471 represents generating an XML response message which includes a class value.

Turning briefly to FIG. 13, an exemplary ownership table 62 is shown. The ownership table 62 comprises a plurality of records, each of which is associated with a BLOB stored in the object storage 317.

The fields of the ownership table 62 comprise a BLOB ID field 85, a class field 86, a destination group ID field 87, and an offset field 88. The BLOB ID field 85 stores a BLOB ID value 89 which identifies a particular BLOB stored in the object storage 317. The class field 86 stores a class value 90 which identifies the type of data within the BLOB which, in the exemplary embodiment may be a file name extension. The destination group ID field 87 stores a destination group ID 91 which identifies the group ID of another transfer client 24 of a remote system or the back end application server 38 which may retrieve the BLOB. The offset field 88 stores an offset value 92 which is an increment value assigned to the BLOB and is useful for preventing duplicate downloading of the same BLOB.

Returning to FIG. 11*i*, step 472 represents encrypting the XML response message (including the event keys) using the predetermined symmetrical encryption algorithm TC Private as the encryption key and step 473 represents packaging the encrypted XML response as a SOAP message and returning such SOAP message to the transfer client 24.

Check for Available BLOB (CFAB) Method

The flow chart of FIG. 11*j* represents a transfer method 51 called CFAB which is executed by the web services server 46 in response to receiving a CFAB method call from a transfer client 24. The CFAB method call is an XML message which includes as its parameters: i) the session ID; ii) class; and iii) offset. The XML message is encrypted using the predetermined symmetrical encryption algorithm and the Sym Key.

Step 476 represents the web services server 46 using the symmetrical encryption algorithm and the Sym Key to decipher the XML method call and recover the Session ID, class, and offset.

Step 477 represents comparing ownership parameters to values within the ownership table 62 to determine whether a BLOB exists for downloading. More specifically, i) the class value 90 provided in the method call is compared to the class value 90 of each record 63 of the ownership table 62 to determine if a BLOB with a class value matching the class value provided in the method call exists; and ii) the group ID 71 (which associates with the session ID value 83 in the user ID table 314) is compared to the destination group ID 91 of each record 63 of the ownership table 62 to determine if a BLOB with a destination group ID 91 matching the group ID 71 of the transfer client 24 exists.

In either case, the offset value 92 provided in the method call is compared to the offset value 92 in the ownership table 62. An offset value 92 in the ownership table 62 that is higher than the offset value 92 provided in the method call indicates that the BLOB has not yet been downloaded and therefore exists for downloading.

If a BLOB exists for downloading as determined at decision box 478, an XML response message which includes the BLOB ID 89 from the record 63 is generated at step 480, the XML response message is encrypted using the predetermined symmetrical encryption algorithm and the Sym Key at step 481, and, at step 482, the encrypted response message is packaged as a SOAP message and returned to the transfer client 24.

Alternatively, if no BLOB meeting the ownership requirements exists at decision box 478, a "no-BLOB" confirmation is returned to the transfer client 24 at step 479. The no-BLOB acknowledgement may be an XML message encrypted using the symmetrical encryption algorithm and the Sym Key and packaged as a SOAP message.

Download BLOB Method

The flow chart of FIG. 11*k* represents a transfer method 51 called Download BLOB which is executed by the web services server 46 in response to receiving a Download BLOB method call from a transfer client 24. The Download BLOB method call is an XML message which includes the Session ID and a BLOB ID as its parameters. The XML message is encrypted using the predetermined symmetrical encryption algorithm and the Sym Key. Step 484 represents the web services server 46 using the symmetrical encryption algorithm and the Sym Key to decipher the XML method call and recover the Session ID and BLOB ID.

Step 485 represents retrieving the BLOB corresponding to the BLOB ID 89 from the object storage 317 and step 486 represents packaging the BLOB within an XML message for return to the transfer client 24. The XML response message is encrypted using the predetermined symmetrical encryption algorithm and the Sym Key at step 487, and, at step 488, the encrypted response message is packaged as a SOAP message and returned to the transfer client 24.

Upload File Method

Figure 11N:
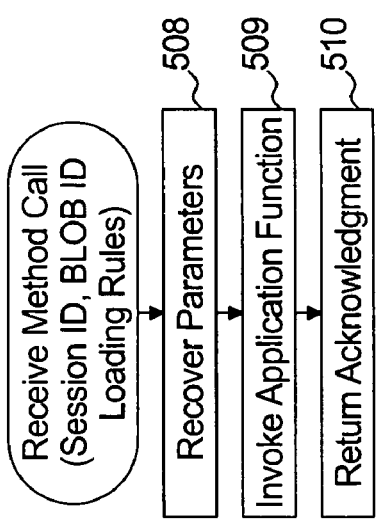
Figure 11M:
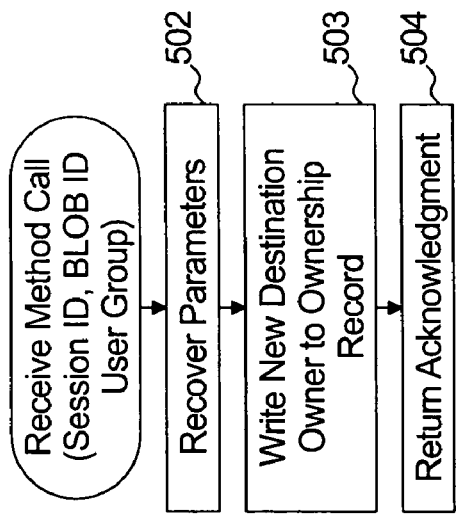
Figure 11L:
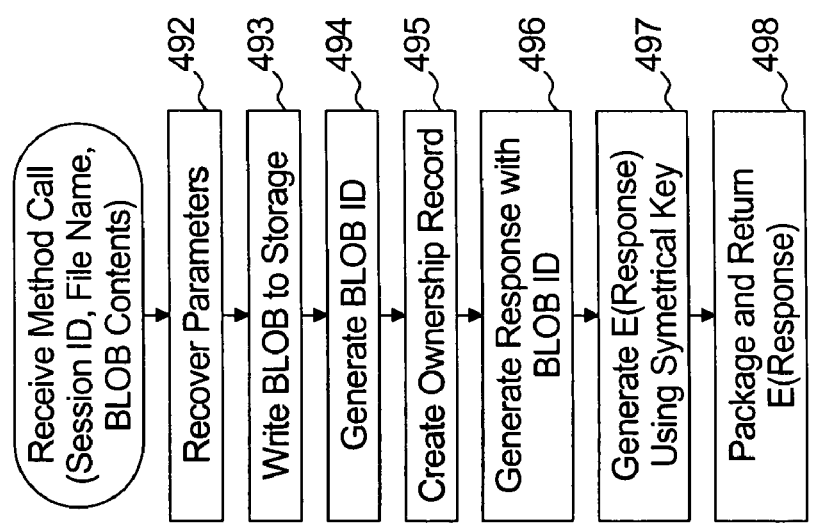

The flow chart of FIG. 11*l* represents a transfer method 51 called Upload BLOB which is executed by the web services server 46 in response to receiving an Upload BLOB method call from a transfer client 24. The Upload BLOB method call is an XML message which includes as its parameters: i) the session ID; ii) File Name; and iii) BLOB contents. The XML message is encrypted using the predetermined symmetrical encryption algorithm and the Sym Key.

Step 492 represents the web services server 46 using the symmetrical encryption algorithm and the Sym Key to decipher the XML method call and recover the Session ID, file name, and BLOB contents.

Step 493 represents writing the BLOB contents to the object storage 317, step 494 represents generating a BLOB ID to associat with the BLOB contents, and step 495 represents creating and populating an ownership record 63 in the ownership table 62.

Step 496 represents generating an XML response message which includes the BLOB ID, 497 represents encrypting the XML response message (including the event keys) using the predetermined symmetrical encryption algorithm and the Sym Key, and step 498 represents packaging the encrypted XML response as a SOAP message and returning such SOAP message to the transfer client 24.

Set Destination BLOB Owner Method

The flow chart of FIG. 11*m* represents a transfer method 51 called Set Destination BLOB Owner which is executed by the web services server 46 in response to receiving a Set Destination BLOB Owner method call from a transfer client 24. The Set Destination BLOB Owner method call is an XML message which includes as its parameters: i) the session ID; ii) BLOB ID; and iii) a group ID. The XML message is encrypted using the predetermined symmetrical encryption algorithm and the Sym Key.

Step 502 represents the web services server 46 using the symmetrical encryption algorithm and the Sym Key to decipher the XML method call and recover the Session ID, BLOB ID, and group ID.

Step 503 represents writing modifying the ownership record 63 associated with the BLOB ID 89 in the ownership table 62 by writing the destination group ID 91 provided in the method call to the detination group ID field 87 of the record 63.

Step 504 represents returning an acknowledgement to the transfer client 24. The acknowledgement may be an XML message encrypted using the symmetrical encryption algorithm and the Sym Key and packaged as a SOAP message.

Process BLOB Method

The flow chart of FIG. 11*n* represents a transfer method 51 called Process BLOB which is executed by the web services server 46 in response to receiving a Process BLOB method call from a transfer client 24. The Process BLOB method call is an XML message which includes as its parameters: i) the session ID; ii) BLOB ID; and iii) loading rules. The XML message is encrypted using the predetermined symmetrical encryption algorithm and the Sym Key.

Step 508 represents the web services server 46 using the symmetrical encryption algorithm and the Sym Key to decipher the XML method call and recover the Session ID, BLOB ID, and loading rules.

Step 509 represents involving an application function of the data processing module 55 for loading the contents of the BLOB into the application tables 319 in accordance with the loading rules. Both identification of the application function and the loading rules are as set forth in the event parameter table 316 and are provided by the transfer client 24 as part of the method call.

Step 510 represents returning an acknowledgement to the transfer client 24. The acknowledgement may be an XML message encrypted using the symmetrical encryption algorithm and the Sym Key and packaged as a SOAP message.

Web Services Server Monitoring Of Polling

In addition to providing the methods discusses with respect to FIGS. 11*a* through 11*n*, the transfer server 60 also includes a session monitoring process 53 for monitoring the Heart Beat method calls of each transfer client 24 and, if a transfer server fails to periodically contact the web services server 46 to update its password and events, the web services server 46 can deactivate the transfer client 24 and generate a heart beat failure alert.

Referring to FIG. 14, the session monitoring process 53 monitors the heart beat audit table 93, and represented by step 231, and in the event that the current time exceeds the most recent time stamp value stored in the session time field 366 and associated with the transfer client 24 and by more than the time interval 78 (stored in the interval field 364 of the record 352 associated with the transfer client 24 in the user ID table 314 of FIG. 3), the transfer client 24 has failed to generate a required heart beat method call within the proper time interval. Determining that such failure exists is represented by decision box 232.

In response to such failure: i) the status field 369 of the record 352 is set to "inactive" at step 233; and ii) notification is sent to the notification address 79 as stored in the alert instruction field 367 of the record 352 at step 234.

Transfer Client

In operation, the transfer client 24 opens a secure web services session with the web services server 46, obtains an indication of events configured by an authorized user from the web services server 46, and makes processing calls to the web services server 46 to execute such events using XML messages (compliant with the web services server WSDL document) within simple object access protocol (SOAP) packages In the aggregate, the processing calls provide for the transfer client 24 to: i) open a web services session and configure the Sym Key with the web services server 46 for use during the session; ii) authenticate itself to the web services server 46 utilizing the authentication credentials 70 as stored in the authentication registry 77; and iii) obtain a Session ID from the web services server 46 for use with subsequent processing calls to the transfer methods 51. The subsequent processing calls enable the transfer client 24 to: i) provide the web services server 46 with a list of printers which are available to the transfer client workstation (so that an administer may configure downloaded files for automated printing); ii) obtain parameters for upload events and download events scheduled for the transfer client 24 (as configured by an authorized user during an HTTPS session between a browser 28 used by the authorized user and the configuration module 47 of the web server 44); and iii) execute each of such scheduled upload events and download events.

In general, execution of an upload event comprises transferring a file found in the upload directory 50*a* and invoking an applicable process within the data processing module 55 for handling the file. Transferring a file found in the upload directory 50*a* comprises: i) encapsulating the file, as a binary large object (e.g. BLOB), within an XML processing call to the transfer server 60; and ii) packaging the XML processing call within a SOAP message wrapper; and iii) transferring the SOAP message as encrypted payload (using the symmetric session key) as a TCP/IP frame tied to the web services session. Invoking an applicable process for handling the file comprises generating a subsequent XML processing call which either: i) instructs the web services server 46 to invoke an applicable process within the data processing module 55 for handling the file if the file is to be loaded into the application tables 319 by the web services server 46; or ii) providing destination ownership information to the web services server 46 if the file is to be subsequently retrieved by the back end application server 38 or another transfer client 24. After the upload, the file is moved from the upload directory 50*a* to a processed files directory 52 to eliminate overwriting the file or transferring the same file to the web services server 46 a second time. A more detailed description of execution of an upload event and the interaction between the transfer client 24 and the web services server 46 is included herein.

In general, execution of a download event comprises: i) generating an XML processing call instructing the web services server 46 to invoke an applicable process within the data processing module 55 for extracting data from the application tables 319 and creating a file for download (if applicable); ii) generating XML processing call(s) to web services server 46 to check if a file with applicable ownership information is available for download (whether newly created by the data processing module 55 or previously provide to the web services server 46 by the back end application server 38); iii) generating XML processing call(s) to the web services server 46 to obtain the file as a BLOB within an XML message; and iv) saving the downloaded file in the download directory 50b for subsequent retrieval by the business process application server 18. A more detailed description of execution of a download event and the interaction between the transfer client 24 and the web services server 46 is included herein.

The transfer client 24 includes a core process 25, local processes 23, spawned upload processes 27 and spawned download processes 29.

In general, the core process 25 directs operation of the transfer client 24 and, more specifically, provides for the transfer client 24 to periodically generate a heart beat method call to the web services server 46 and, when appropriate: i) initiate a web services session and obtain a session ID from the web services server 46, ii) update its password value 73; iii) update the available printers table 318; and iv) obtain event parameters for upload events and download events. Each of the spawned upload processes 27 and download processes 29 is built by the transfer client 24 utilizing event parameters received from the web services server 46 for the purposes of executing the upload event of download event respectively. Each of the core process 25 and the spawned processes 27 and 29 make calls to local processes 23 (which are shown in the table of FIG. 15) for performing applicable functions.

Figure 16:
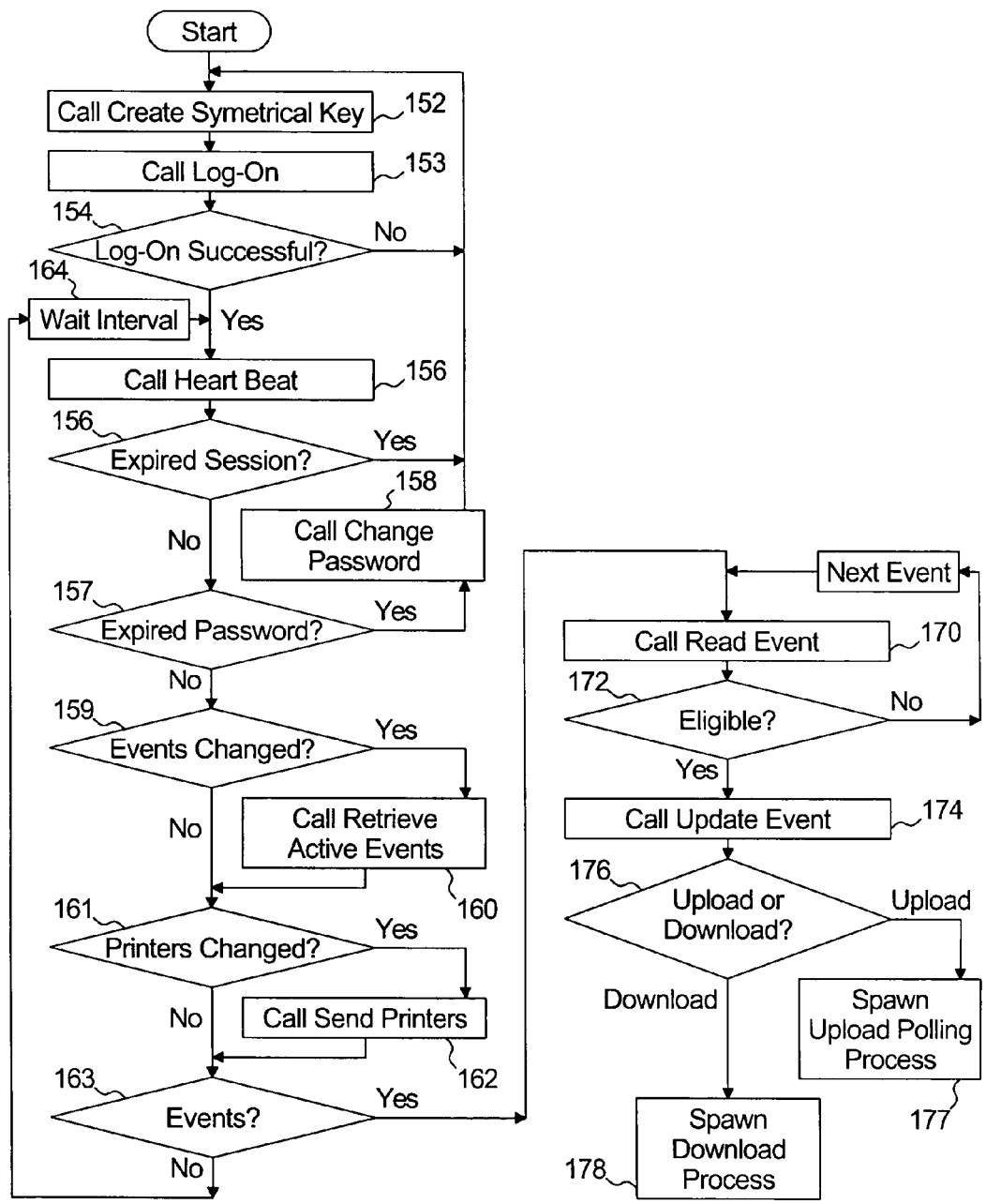
FIG. 16 is a flow chart representing exemplary core process of a transfer client in accordance with one embodiment of the present invention.

The flow chart of FIG. 16 represents exemplary operation of the core process 25. The core process 25 begins running upon loading of the transfer client 24 onto the workstation 22.

Step 152 represents the transfer client applications 24 executing a local process 23 called create symmetrical key. The create symmetrical key local process generates a method call to the Create Symmetrical Key transfer method 51 operated by the web services server 46.

Figure 17A:
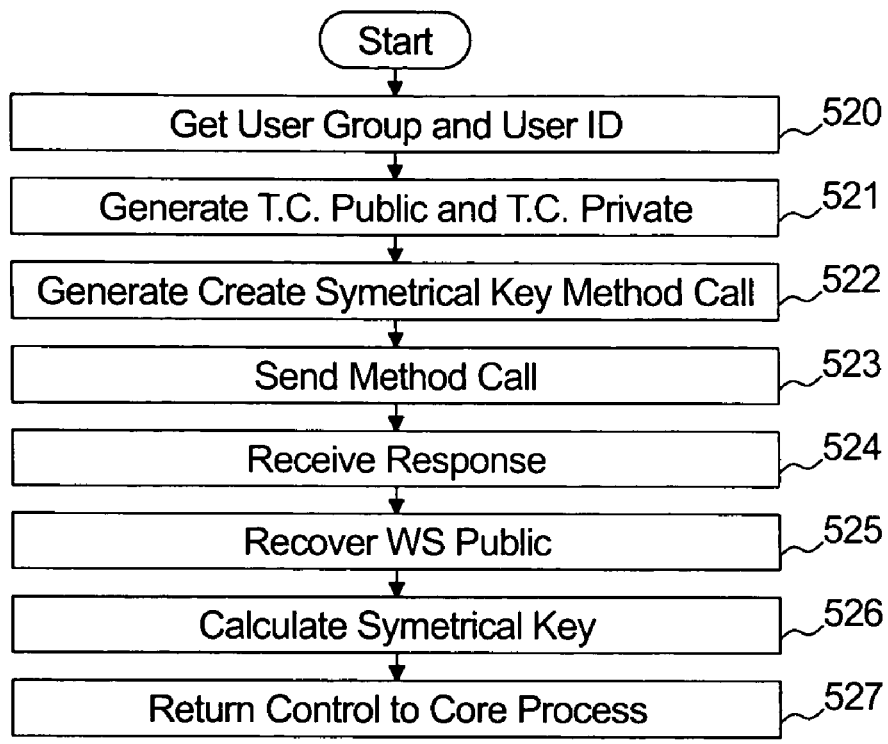
FIGS. 17a through 17f are flow charts representing exemplary local processes of a transfer client in accordance with one embodiment of the present invention.

Turning briefly to the flow chart of FIG. 17a, exemplary processing steps of the create symmetrical key local process are shown. Step 520 represents the local process obtaining the user group 71 and the user ID 72 from the authentication registry 70. The user group 71 and the user ID 72 are required parameters for the method call to the Create Symmetrical Key transfer method 51.

Step 521 represents the local process generating a public/private key pair for use with the predetermined symmetrical encryption algorithm (e.g TC Public and TC Private). As discussed, TC Private is a random integer value and TC public is calculated from TC Private, the predetermined generator value and the predetermined large prime number. TC Public is a required parameter for the method call to the Create Symmetrical Key transfer method 51.

Step 522 represents embodying the parameters within an XML method call to the Create Symmetrical Key transfer method 51, step 523 represents sending the method call to the web services server 46, and step 524 represents receiving a response back from the web service.

As discussed with respect to FIG. 11a, the response will be an XML response message (that includes WS Public) encrypted using the symmetrical encryption algorithm and TC Public as the encryption key. Step 525 represents using the symmetrical encryption algorithm and TC Private to recover WS public from the response message.

Step 526 represents using WS Public and TC Private to calculate the Sym Key and step 527 represents returning control to the core process 25.

Returning to FIG. 16, step 153 represents the transfer client application 24 executing a local process 23 called log-on. The log-on local process generates a method call to the Log-On transfer method 51 operated by the web services server 46.

Figure 17B:
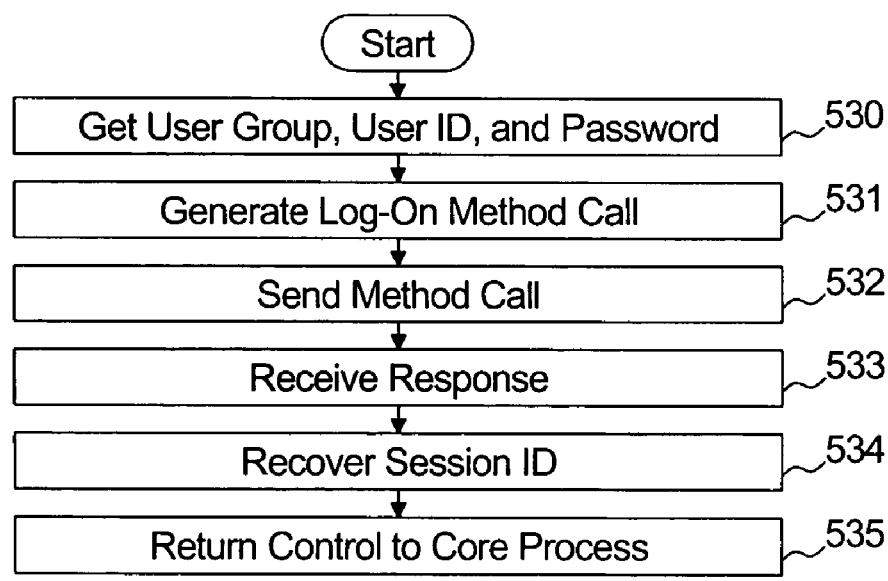

Turning briefly to the flow chart of FIG. 17b, exemplary processing steps of the log-on key local process are shown. Step 530 represents the local process obtaining the user group 71, the user ID 72, and the password 73 from the authentication registry 77, each of which is a required parameter for the method call to the Log-On transfer method 51.

Step 531 represents embodying the parameters within an XML method call to the Log-On transfer method 51, step 532 represents sending the method call to the web services server 46, and step 533 represents receiving a response back from the web service.

As discussed with respect to FIG. 11b, the response will be an XML response message (that includes the Session ID) encrypted using the symmetric encryption algorithm and Sym Key as the encryption key. Step 534 represents using the symmetric encryption algorithm and Sym Key to recover the Session ID from the response message and step 535 represents returning control to the core process 25.

Returning to the flow chart of FIG. 16, if the logon is successful, as determined at step 154, a first or a plurality of periodic heart beat method calls to the web server 46 is performed. More specifically, step 155 represents the transfer client application 24 executing a local process 23 called heart beat. The heart beat local process generates a method call to the Heart Beat transfer method 51 operated by the web services server 46.

Figure 17C:
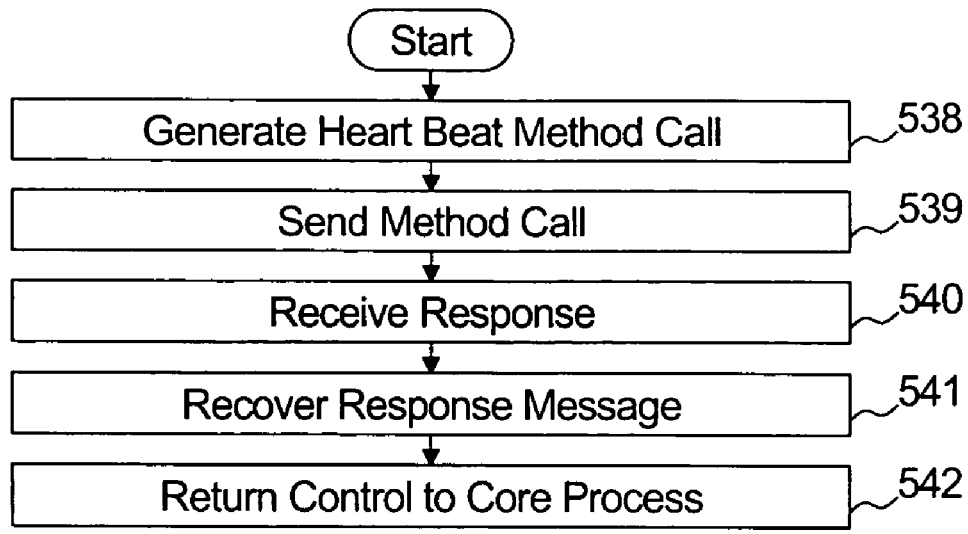

Turning briefly to the flow chart of FIG. 17c, exemplary processing steps of the heart beat key local process are shown. Step 538 represents embodying the session ID within an XML method call to the Heart Beat transfer method 51, step 539 represents sending the method call to the web services server 46, and step 540 represents receiving a response back from the web services server 46.

As discussed with respect to FIG. 11c, the response will be an XML response message encrypted using the symmetric encryption algorithm and Sym Key as the encryption key. Step 541 represents using the symmetric encryption algorithm and Sym Key to recover the response message and step 542 represents returning control to the core process 25.

Returning to the flow chart of FIG. 16, and as discussed with respect to FIG. 11c, the response to the Heart Beat method call can be any of: i) an expired session response; ii) an expired password response; iii) an events changed response; or iv) a heart beat acknowledgement.

If, at step 156, the response is an expired session response, the core process returns to step 152 wherein the create symmetrical key local function is again performed.

If the session has not expired as determined at step 156 and if, at step 157, the response is an expired password response, a local process called change password is executed at step 158. The local process makes a method call to the Change Password transfer method 51 operated by the web services server 46.

Figure 17D:
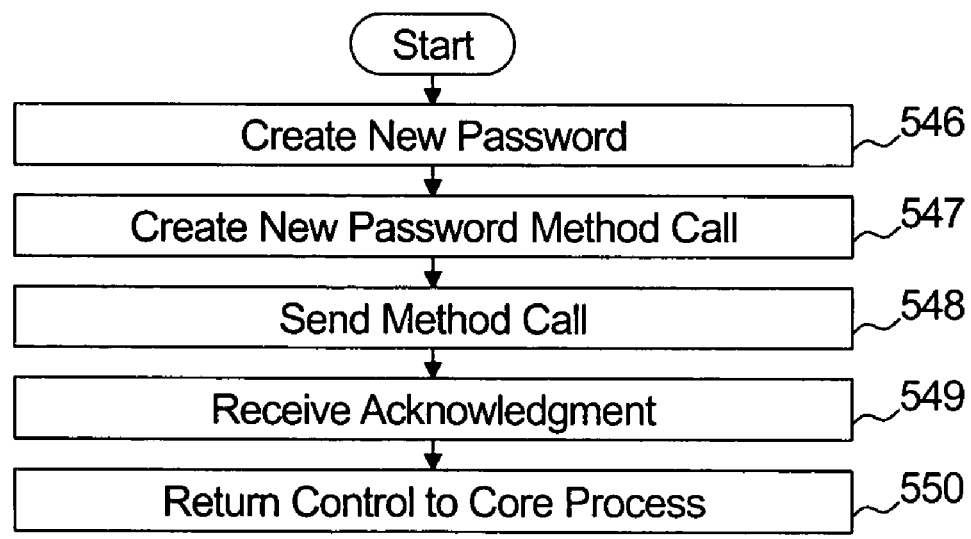

Turning briefly to FIG. 17d, step 546 represents generating a new password and step 547 represents embodying the session ID, the old password, and the new password within an XML method call to the Change Password transfer method 51, step 548 represents sending the method call to the web services server 46, step 549 represents receiving the change password acknowledgement back from the web services server 46; and step 550 represents returning control to the core process 25.

Returning again to FIG. 16, after the password has been updated in accordance with step 158, the core process returns to step 152 wherein the create symmetrical key local function is again performed.

If neither the session is expired (as determined at step 156), nor the password expired (as determined at step 157), it is determined at step 159 whether the response to the Heart Beat method call is an events changed response. If yes, a local process called retrieve active event keys is executed at step 160. The local process makes a method call to the Retrieve Active Event Keys transfer method 51 operated by the web services server 46.

Figure 17E:
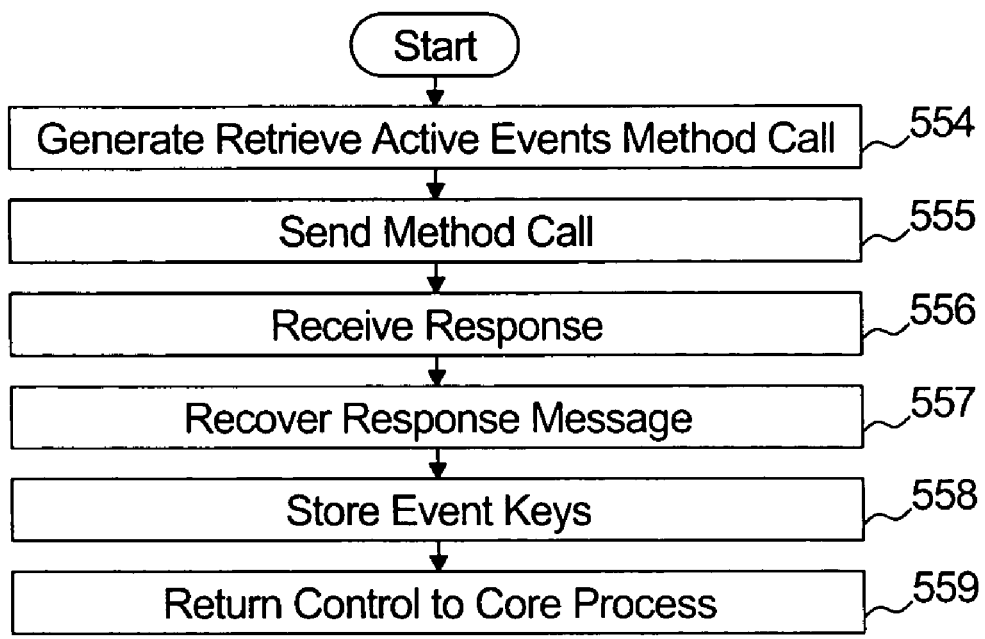

Turning briefly to FIG. 17e, step 554 represents embodying the session ID within an XML method call to the Retrieve Active Event Keys transfer method 51, step 555 represents sending the method call to the web services server 46, and step 556 represents receiving a response back from the web services server 46.

As discussed with respect to FIG. 11e, the response will be an XML response message which includes active event keys associated with the transfer client 24 and is encrypted using the symmetric encryption algorithm and Sym Key as the encryption key. Step 557 represents using the symmetric encryption algorithm and Sym Key to recover the active event keys within the response message; step 558 represents writing the event keys to local memory, and step 559 represents returning control to the core process 25.

Returning to the flow chart of FIG. 16, after event keys are obtained at step 160 (or if step 160 is not performed because of no event changes), it is determined at step 161 whether a list of locally available printers has changed.

If the list of locally available printers has changed, a local process called send printers is executed at step 162. The local process makes a method call to the Send Printers transfer method 51 operated by the web services server 46.

Figure 17F:
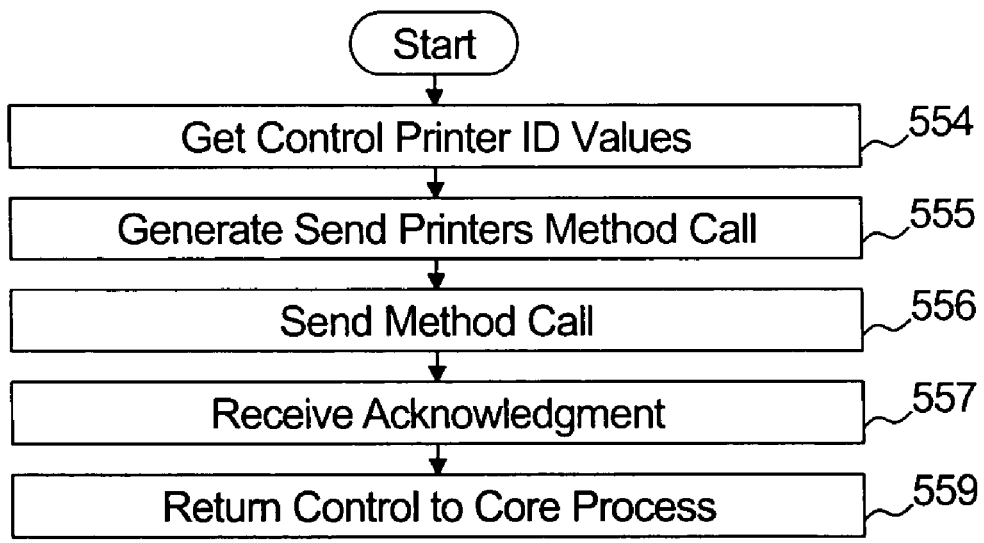

Turning briefly to FIG. 17f, step 562 represents retrieving the list of available local printers from the operating system.

Step 563 represents embodying a list of printer IDs representing the available printers along with the session ID within an XML method call to the Send Printers transfer method 51, step 564 represents sending the method call to the web services server 46, step 565 represents receiving an acknowledgement back from the web services server 46, and step 566 represents returning control to the core process 25.

Returning again to FIG. 16, after printer IDs are sent to the web services server 46 at step 162 (or if printer IDs are not sent because of no printer changes as determined at step 161), it is determined at step 163 whether one or more events require execution. If no events require execution, the transfer client 24 waits the time interval 78 (FIG. 3) before again making a method call to the Heart Beat transfer method 51 at step 155.

If one or more events require execution, each event is performed in sequence. Execution of an event requires first making a processing call to the local read event process which in turn makes a method call to the Read Event transfer method 51 operated by the web services server 46.

More specifically, step 170 represents executing a local process 23 called Read Event. The local process makes a method call to the Read Event transfer method 51 operated by the web services server 46. The local process provides the Session ID 83 and the event key value 80 as parameters of the XML method call. In response, the web services server 46 executes its Read Event method as discussed with respect to FIG. 11f and returns a response XML message (encrypted using the symmetrical encryption algorithm and the Sym Key). The XML message includes all of the parameters associated with the event key value 80 in the event parameter table 316—with the parameter ID 321 being the XML tag and the parameter value 322 being associated with the tag.

Decision box 172 represents determining whether the event associated with the Event Key value 80 is eligible to run. For example, parameters of the event parameter table 316 may identify certain time periods or certain frequencies that events may be ran. If the event is outside of such time period or frequency parameters, the event is considered ineligible to run. If not eligible, the next event key value 80 is selected and the clock process 23 Read Event is executed for such next event key value 80 at step 170.

Step 174 represents executing a local process 23 called update event. Update Event makes a method call to the Update Event transfer method 51 operated by the web services server 46. The local function provides the Session ID 83, event key value 80, status information (such as the time the event was started, the time the event was completed, or the time the event was aborted) and an offset value as parameters of the method call. The purpose of this Update Event processing call is to update applicable fields in the event parameter table 316 to indicate the then current status of the event. In response, the web services server 46 will execute its Update Event Method as discussed with respect to FIG. 11h for purposes of updating the applicable status records of the event parameters table 316.

The event associated with the event key value 80 may be any of a download event, an upload event, or a gateway event. The type of event is identified by a parameter value returned at step 170. Step 176 represents determining whether the event is an upload event or a download event. If the event is an upload event, an upload polling process 27 is spawned at step 177. If the event is a download event, a download process 29 is spawned at steps 178.

Spawning Download Process

Figure 18:
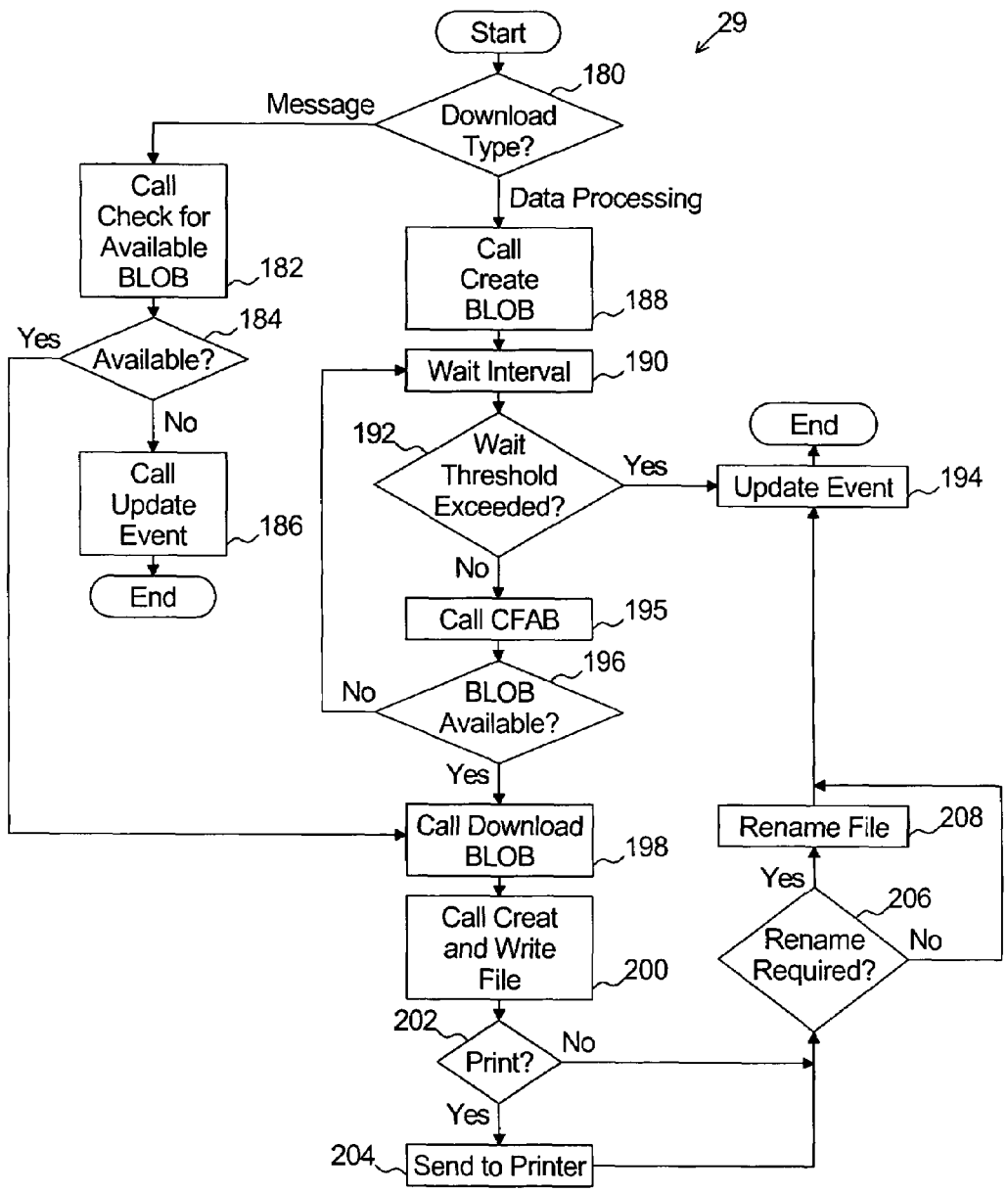
FIG. 18 is a flow chart representing an exemplary download process in accordance with one embodiment of the present invention.

The flow chart of FIG. 18 represents exemplary operation of a spawned download process 29.

Step 180 represents determining the type of the download event. The download event may be either a message event or a data processing event. The type of event is identified by the event type parameter 344 from the event parameter table 316 and received at step 170.

If the event is a message event, the transfer client 24 executes a local process 23 called Check for Available BLOB. The local function makes a method call to a the Check For Available BLOB transfer method 51 operated by the web services server 46. The local process provides the Session ID 83, a class value 90, and offset value 92 as parameters of the method call. In response, the web services server 46 executes its Check For Available BLOB method as discussed with respect to FIG. 11i and returns a BLOB ID 89 if a BLOB meeting the criteria is available and not yet downloaded.

If no BLOB is available, as determined at decision box 184, the transfer client 24 again executes the local process 23 called Update Event at step 186—for the purpose writing an indication that the event is complete to applicable records of the event parameter table 316.

Following execution of Update Event, the transfer client again returns to step 170 where the function Read Event is executed for the next Event Key value 80 provided by the web services server 46.

If a BLOB is available at decision box 184, the transfer client 24 executes a local process 23 called Download BLOB. The local process 23 makes a method call to the Download BLOB transfer method 51 operated by the web services server 46. The local function provides the Session ID 83 and BLOB ID 89 as parameters of the method call. In response, the web services server 46 executes its Download BLOB Method as discussed with respect to FIG. 11*j* and returns the contents of the BLOB associated with the BLOB ID 89.

Step 200 represents the transfer client 24 executing a local process 23 called Create And Write File. Create And Write File stores the BLOB using the file name parameter 342 in the in the download directory 50*b* identified by the download directory path parameter 343—both associated with the event in the event parameter table 316 and provided to the transfer client in response to the Read Event method call at step 170.

Step 202 represents determining whether the file just downloaded should be queued for automatic printing. The event parameters received at step 170 may include an indication that the file should be automatically printed (e.g. print code 357) and an indication of one of the available printers (e.g. printer 363). If yes at step 202, the transfer client 24 executes a local function called Send To Printer at step 204. The local function retrieves the printer ID from the parameters provided at step 170 and queues the file for the printer.

Following execution of Send to Printer, or upon determining that the downloaded file is not to be sent to a printer, the transfer client 24 determines whether the Event Parameters require renaming the file as represented by decision box 206.

If yes, step 208 represents the transfer client 24 executing a local process 23 called Rename File. The parameters of Rename File are the old file name and the new file name. The local process 23 renames the file with the old file name to the new file name.

Following renaming of the file at step 208 or following determining that the file is not to be renamed at step 206, the local process 23 Update Event is again called at step 194.

Returning to decision box 180, if the download type is a data processing download, the transfer client 24 executes a local process 23 called Create BLOB. The local process makes a method call to a transfer method 51 operated by the web services server 46. The transfer method 51 is also called Create BLOB. The local process provides the Session ID 83, Profile ID 347, and extract rules 349 as parameters of the method call. In response the web services server 24 will execute its Create Blob Method as discussed with respect to FIG. 11*h*.

Following the Create BLOB method call, the transfer client 24 waits a time interval, at step 192, while the web services server 24 executes its Crate Blob Method. If at decision box 192, the total time elapsed since the Create BLOB method call was mad exceeds a threshold, the transfer client effectively aborts the download and proceeds to step 194 where the Update Event function is executed to write a status to the applicable status records of the event parameters table 316 indicating that the event was aborted.

If a decision box 192 the total time elapsed since the Create BLOB method call was made had not exceeded the threshold, the transfer client 24 executes the local Check For Available BLOB function at step 195 (as previously discussed with respect to Step 182). In response, the web services server 46 returns a BLOB ID if a BLOB meeting the criteria is available and not yet downloaded. Presumably the BLOB was created in response to the Create BLOB method call and is now available.

If no BLOB is available, as determined at decision box 196, the transfer client 24 returns to step 190 to again wait for a predetermined time interval.

If a BLOB is available at decision box 196, the transfer client 24 executes the local Download BLOB function at step 198 as previously discussed.

Spawned Upload Process

Figure 19B:
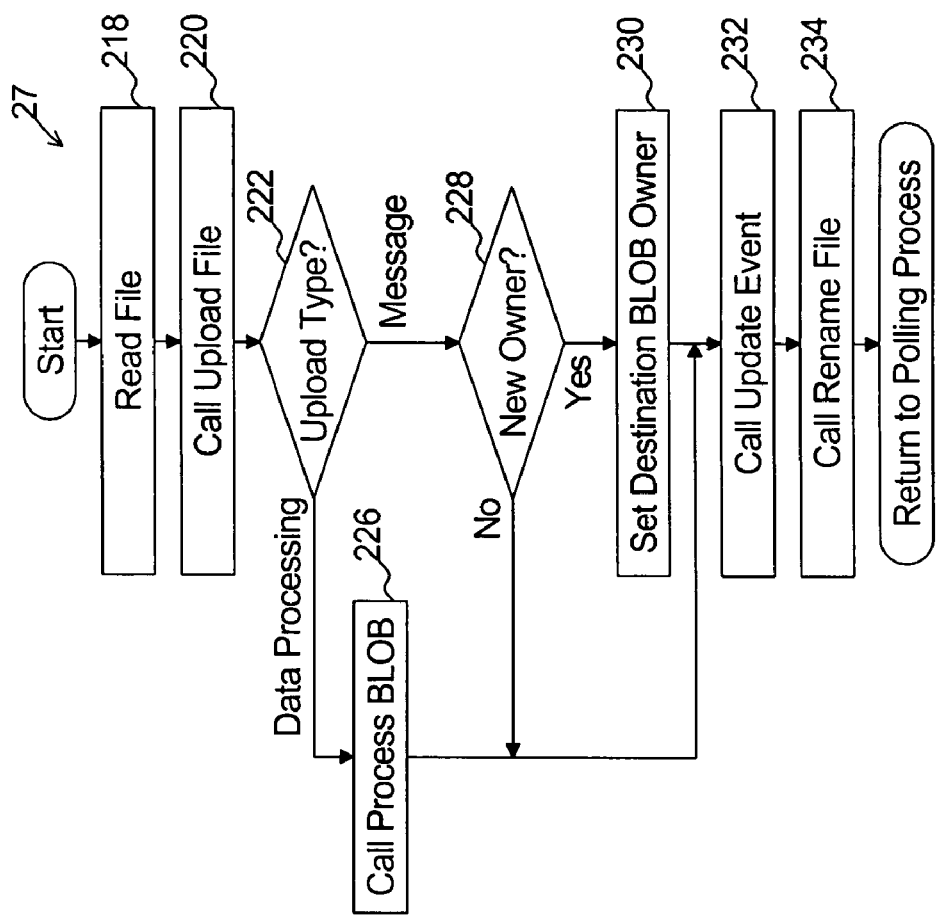
FIG. 19b is a flow chart representing an exemplary upload process in accordance with one embodiment of the present invention.
Figure 19A:
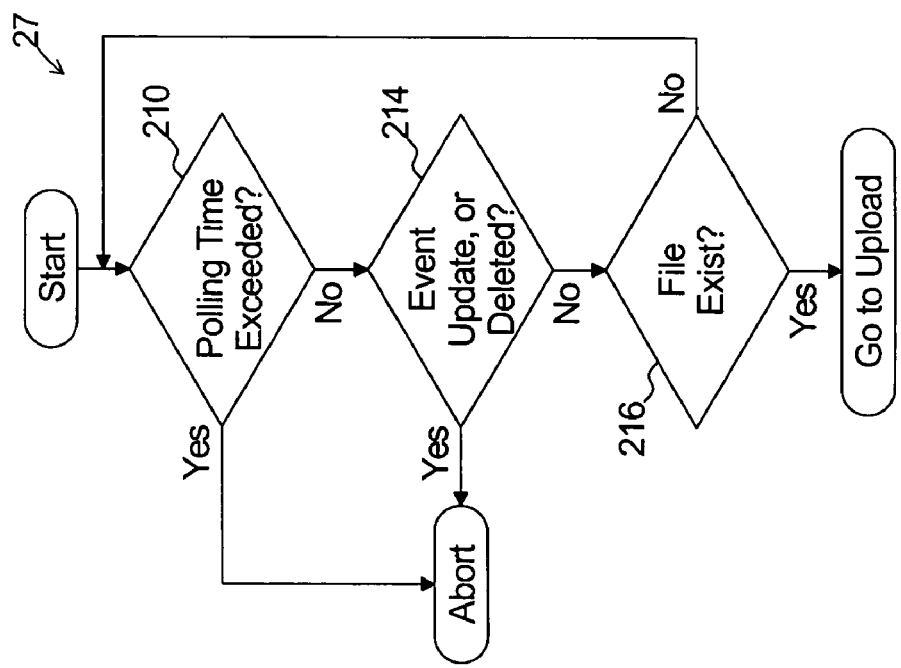
FIG. 19a is a flow cart representing an exemplary upload polling process in accordance with one embodiment of the present invention.

The flow charts of FIGS. 21*a* and 21*b* represents steps of a spawned upload process 27. In the exemplary embodiment, the upload process 27 will continually search the upload directory 50*a* for an applicable file and, if the file is located, proceed to steps which upload the file to the web services server. The flow chart of FIG. 19*a* represents the upload process continually searching (e.g polling) the upload directory and the flow chart of FIG. 19*b* represents uploading the file to the web services server 46.

Decision box 210 represents determining whether a polling time threshold has been exceeded. The spawned upload process 27 will only continue to search the upload directory 50*a* for a limited period of time referred to as the polling time threshold. If this has been exceeded, the polling process is aborted.

If the polling time threshold has not been exceeded at decision box 210, the polling process determines whether the event has been updated or deleted at step 214. Determining whether the event has been updated or deleted may include making another Read Event method call to the web services server 46 to determine whether event parameters have been changed or the event deleted. If the event has been updated or deleted, the process is aborted polling process aborts. The event, to the extend updated is processes as a "new" event beginning with step 172 of the flow chart of FIG. 16.

If the event has not been updated or deleted, the process determines whether the applicable file (as identified by the file name parameter 323 in the event parameter table 316) exists in the applicable upload directory 50*a* (as identified by the upload directory path parameter 324 in the event parameter table 316) at decision box 216. If the file does not exist, the polling process again returns to decision box 210 to determine whether the polling time threshold has been exceeded. If the file exists at decision box 216, the transfer client 24 begins execution of an upload process as shown in FIG. 19*b*.

Turning to FIG. 19*b*, step 218 represents calling a local process 23 called Read File to obtain the file from the upload directory 50*a* and step 220 represents calling a local process 23 called Upload File. Upload file makes a method call to a transfer method 51 operated by the web services server 46. The transfer method 51 is also called Upload File. The local function provides the Session ID 83 and File Name as parameters of the method call. In response, the web services server 46 executes its Upload File Method as discussed with respect to FIG. 11*k* to obtain the BLOB, store the BLOB in object storage 317 and create an applicable record in the ownership table 62. The class value 90 is derived from the file name included in the Upload File method call.

Decision box 222 represents determining the upload file process determining the upload file type—which is indicated in a BLOB handling parameter 326 provided at step 170. If the upload file type is data processing, step 225 represent the execution of a local process 23 called Process BLOB. The local process makes a method call to a transfer method 51 operated by the web services server 46. The transfer method 51 is also called Process BLOB. The local process provides the Session ID 83, BLOB ID 89, and loading rules 327 (from the event parameters table 316) as parameters of the method call. In response, the web services server 46 executes its Process BLOB Method as discussed with respect to FIG. 11n.

If at decision box 222 the upload type is a message, a determining as to whether a new destination group must be written to the ownership table 62 at step 228. If yes, step 230 represents execution of a local process called Set Destination BLOB Owner. The local process makes a method call to the Set Destination BLOB Owner transfer method 51 operated by the web services server 46. The transfer method 51 is also called Set Destination BLOB Owner. The local process provides the Session ID 83, BLOB ID 89, and destination group ID 325 as parameters of the method call. In response, the web services server 46 executes its Set Destination BLOB Owner Method as discussed with respect to FIG. 11m.

Step 232, represents executing the Update Event local function as previously discussed to indicate that the event is complete.

Step 235 represents execution of a local function called Rename File for purposes of renaming and moving the file from the upload directory 50a to a unique file name (such as the original file name combined with a time stamp at which the rename occurred) within a processed files directory 52a.

Audit Log

FIG. 20 represents an exemplary audit log tables 312 which may include a plurality of audit logs 340a-340c—one for each transfer client 24. Each audit log 340 comprises a plurality of records 322, each representing a recorded audit event. The fields of the audit log 340 comprise a date field 341, a time field 346, a method called field 348, and parameters passed field 350.

The date field 341 and the time field 346 establish the date and time at which the record 339 was written to the audit log table 84. The method called field identifies the transfer method 51 that was called and the parameters passed field 350 contains the parameters included in the method call. Each method called is logged in the audit table 312.

Back End Server

In the exemplary embodiment, the back end server application 38 interacts with the web services server in the same manner as the transfer client 24. More specifically, the back end server application 38 may include a transfer client 24 for making method calls to the transfer methods 51 to (as discussed with respect to FIGS. 9a through 9n) for obtaining files stored in the object storage 317 by another system and placing objects in the object storage 317 for retrieval by other systems.

In another embodiment, the back end application server 38 may obtain the object directly from the database 40. FIGS. 17a and 17b represent operation of the back end server application 38 obtaining object from, and putting objects to, the database 40.

Referring to FIG. 21a, step 392 represents the occurrence of an event wherein the back end server application 38 will attempt to obtain a binary object from the object storage 317 of the database 40. Such events may be any events generated internally and applicable to the data processing functions of the back end server application 38.

Step 394 represents accessing the ownership table 62 to determine whether an object with applicable ownership information exists in the object storage 317. If not, there is no object to retrieve. If an object in the object storage 317 matches the ownership information, the back end application server 38 obtains the location of the object form the ownership table 62 and obtains the object at step 396.

Referring to FIG. 21b, step 397 represents the occurrence of an event wherein the back end server application 38 will put a binary object into the object storage 317 of the database 40. Again, such events may be any events generated internally and applicable to the data processing functions of the back end server application 38.

Step 398 represents writing the object to the object storage 317 in the database 40. Steps 399 and 400 represent adding a record to the message table 62 and writing the location of the object within the object storage 317 and the ownership information to the newly created record.

It should be appreciated that the above described systems provide for unattended transfer of files over an open network between two unattended application such as the business process application server 18 and either the data processing module 55 of the web services server 46 or the back end application server 38.

It should also be appreciated that such transfer is facilitated by a self installing remote transfer client thereby eliminating the need for cumbersome FTP solutions.

Although the invention has been shown and described with respect to certain preferred embodiments, it is obvious that equivalents and modifications will occur to others skilled in the art upon the reading and understanding of the specification. It is envisioned that after reading and understanding the present invention those skilled in the art may envision other processing states, events, and processing steps to further the objectives of the modular multi-media communication management system of the present invention. The present invention includes all such equivalents and modifications, and is limited only by the scope of the following claims.

What is claimed is:

1. A system for secure automated transfer of files between a database and a remote file transfer client over a network the Internet, the system comprising:
    a local area network;
    the database:
        wherein the database is coupled to the local area network; and
        wherein the database comprises the transfer tables;
    a computer hardware system:
        wherein the computer hardware system is coupled a second network;
        wherein the second network is coupled to the local area network by an inner firewall and coupled to the Internet by an outer firewall; and
        wherein the computer hardware system includes an encoded hypertext transport protocol (HTTP) server application and an encoded web services server application;
    wherein the HTTP server application is configured to:
        provide a web page to an HTTP client over the Internet to obtain user input, wherein said user input comprises:
            file transfer event parameters defining each of a plurality of file exchange events; and
            identification of the remote file transfer client to which the file transfer event parameters are associated; and
        send the file transfer event parameters in association with the identification of the remote file transfer client to the database over the local area network, wherein the database stores the file transfer event parameters in association with the identification of the remote file transfer client in the file transfer tables;

wherein the web services server application comprises a plurality of file transfer methods available to the remote file transfer client making method calls thereto, the plurality of transfer methods comprising:

a session ID method, wherein the session ID method is configured to, in response to receiving a session ID method call from the remote transfer client that includes authentication credentials of the remote transfer client;

assign a session ID to a web services session with the remote transfer client only if the authentication credentials of the remote transfer client match those of a valid remote transfer client;

store the session ID in association with identification of the remote transfer client in a user ID table; and return the session ID to the remote transfer client;

an event definition method, wherein said event definition method is configured to provide, to the remote transfer client, the file transfer event parameters that are associated with the remote transfer client in response to receiving a method call from the remote transfer client that includes the session ID returned to the remote transfer client;

a plurality of file exchange methods, wherein each file exchange method begin configured to execute a file exchange event with the remote transfer client in response to receiving a method call from the remote transfer client that includes file transfer parameters that define the file exchange event and the session ID returned to the remote transfer client;

a symmetrical key definition method, wherein the symmetrical key method is configured to, in response to receiving a create key method call from the remote transfer client that includes a client public encryption key generated by the remote transfer client;

calculate a symmetrical encryption key for use with a predetermined symmetrical encryption algorithm from the client public encryption key and a server private encryption key; and return a server public encryption key to the remote transfer client as a message encrypted using the predetermined symmetrical encryption algorithm and the client public encryption key;

wherein, each method call from the remote transfer client is packaged as a message sent over the Internet and encrypted using the predetermined symmetrical encryption algorithm and the symmetrical encryption key;

wherein, each response to the remote transfer client is packaged as a message sent over the Internet and encrypted using the predetermined symmetrical encryption algorithm and the symmetrical encryption key;

wherein symmetrical encryption key comprises both:
 a remainder of the server private encryption key raised to a power of the client public encryption key, divided by a predetermined prime integer; and
 a remainder of the client private encryption key raised to a power of the server public encryption key, divided by the predetermined prime integer;

wherein, the server private encryption key is an integer value generated by the web services server;

wherein, the server public encryption key is the remainder of a predetermined generator value raised to the power of the server private encryption key, divided by the predetermined prime integer;

wherein, the client private encryption key is an integer value generated by the remote transfer client; and wherein the client public encryption key is the remainder of the predetermined generator value raised to the power of the client private encryption key, divided by the predetermined prime integer.

2. A system for secure automated transfer of files between a database and a remote file transfer client over the Internet, the system comprising:

a local area network;
the database;
 wherein the database is coupled to the local area network; and
 wherein the database comprises file transfer tables;
a computer hardware system;
 wherein the computer hardware system is coupled to a second network;
 wherein the second network is coupled to the local area network by an inner firewall and coupled to the Internet by an outer firewall; and
 wherein the computer hardware system includes an encoded hypertext transport protocol (HTTP) server application and an encoded web services server application;
wherein the HTTP server application is configured to:
 provide a web page to an HTTP client over the Internet to obtain user input, wherein said user input comprises:
  file transfer event parameters defining a file download event, the file transfer event parameters comprising identification of a file; and
  identification of the remote file transfer client to perform the file download event; and
 send the file transfer event parameters in association with the identification of the remote file transfer client to the database over the local area network, wherein the database stores the file transfer event parameters in association with the identification of the remote file transfer client in the file transfer tables;
wherein the web services server application comprising a plurality of file transfer methods available to the remote file transfer client making method calls thereto, the plurality of transfer methods comprising:
 a session ID method, wherein the session ID method is configured to, in response to receiving a session ID method call from the remote transfer client that includes authentication credentials of the remote transfer client;
  assign a session ID to a web services session with the remote transfer client only if the authentication credentials match those of a valid remote transfer client;
  store the session ID in association with identification of the remote transfer client in a user ID table; and
  return the session ID to the remote transfer client;
 an event definition method, wherein the event definition method is configured to provide to the remote transfer client, the file transfer event parameters that are associated with the remote transfer client in response to receiving a method call that includes the session ID returned to the remote transfer client;
 a file download method, wherein the download file method is configured to, in response to receiving a method call comprising the identification of a file and the session ID, generate a file download response message to the remote transfer client, the file download response message comprising a binary object associated with the identification of the file;

a symmetrical key definition method, the symmetrical key definition method is configured to, in response to
receiving a create key method call from the remote transfer client that includes a client public encryption key generated by the remote transfer client;
calculate a symmetrical encryption key for use with a predetermined symmetrical encryption algorithm from the client public encryption key and a server private encryption key; and
return a server public key to the remote transfer client as a message encrypted using the predetermined symmetrical encryption algorithm and the client public encryption key;

wherein, each method call from the remote transfer client is packaged as a message sent over the Internet and encrypted using the predetermined symmetrical encryption algorithm and the symmetrical encryption key;

wherein, each response to the remote transfer client is packaged as a message sent over the Internet and encrypted using the predetermined symmetrical encryption algorithm and the symmetrical encryption key;

wherein, the symmetrical encryption key comprises both:
a remainder of the server private encryption key raised to a power of the client public encryption key, divided by a predetermined prime integer; and
a remainder of the client private encryption key raised to a power of the server public encryption key, divided by the predetermined prime integer;

wherein, the server private encryption key is an integer value generated by the web services server;

wherein, the server public encryption key is the remainder of a predetermined generator value raised to the power of the server private encryption key, divided by the predetermined prime integer;

wherein, the client private encryption key is an integer value generated by the remote transfer client; and wherein, the client public encryption key is the remainder of the predetermined generator value raised to the power of the client private encryption key, divided by the predetermined prime integer.

3. A method of operating a computer hardware system for secure remote transfer of files between a database and a remote file transfer client over the Internet, the method comprising:

providing a web page over the Internet to an HTTP client to obtain user input, wherein the user input comprises:
file transfer event parameters defining each of a plurality of file exchange events; and
identification of a remote file transfer client with which the file transfer events associate;

sending the file transfer event parameters over a local area network to the database for storage in file transfer tables;

assigning in response receiving a session ID method call from the remote transfer client, a session ID to a web services session with the remote transfer client only if authentication credentials provided in the session ID method call match those of a valid remote transfer client;

storing the session ID in association with identification of the remote transfer client in a user ID table;

returning the session ID to the remote transfer client over the Internet;

providing, to the remote transfer client over the Internet, the file transfer event parameters that are associated with the remote transfer client in response to receiving a file transfer method call from the remote transfer client;

executing each of a plurality of file exchange methods, wherein each file exchange method being executed in response to receiving a method call from the remote transfer client that includes the file transfer parameters that define the file exchange event and the session ID;

generating a symmetrical encryption key for use with a symmetrical encryption key algorithm in response to receiving a create key method call from the remote transfer client that includes a client public encryption key generated by the remote transfer client, wherein generating the symmetrical key comprises:
calculating the symmetrical encryption key for use with a predetermined symmetrical encryption algorithm from the client public encryption key and a server private encryption key; and
returning a server public key to the remote transfer client as a message encrypted using the predetermined symmetrical encryption algorithm and the client public encryption key;

wherein, each method call from the remote transfer client is packaged as a message sent over the Internet and encrypted using the predetermined symmetrical encryption algorithm and the symmetrical encryption key; and wherein, each response to the remote transfer client is packaged as a message sent over the Internet and encrypted using the predetermined symmetrical encryption algorithm and the symmetrical encryption key;

wherein, the symmetrical encryption key comprises both:
a remainder of the server private encryption key raised to a power of the client public encryption key, divided by a predetermined prime integer;
a remainder of the client private encryption key raised to a power of the server public encryption key, divided by the predetermined prime integer; and wherein, the sever private encryption key is an integer value generated by the web services server;

wherein, the server public encryption key is the remainder of a predetermined generator value raised to the power of the server private encryption key, divided by the predetermined prime integer;

wherein, the client private encryption key is an integer value generated by the remote transfer client; and wherein, the client public encryption key is the remainder of the predetermined generator value raised to the power of the client private encryption key, divided by the predetermined prime integer.

4. A method of operating a computer hardware system for secure remote transfer of files between a database and a remote file transfer client over the Internet, the method comprising:

providing a web page over the Internet to an HTTP client to obtain user input, wherein the user input comprises:
file transfer event parameters defining a file download event, the file transfer event parameters comprising identification of a file; and
identification of the remote file transfer client to perform the file download event; and sending the file transfer event parameters over a local area network to the database for storage in file transfer tables;

assigning, in response receiving a session ID method call from the remote transfer client, a session ID to a web services session with the remote transfer client only if authentication credentials provided in the method call match those of a valid remote transfer client;

storing the session ID in association with identification of the remote transfer client in a user ID table; and returning the session ID to the remote transfer client over the Internet;

providing, to the remote transfer client over the Internet, the file transfer event parameters that are associated with the remote transfer client in response to receiving a file transfer method call comprising the session ID from the remote transfer client;

providing a file download response message to the remote transfer client in response to receiving a file download method call from the remote transfer client;
  wherein the file download method call comprises the file transfer event parameters and the session ID; and
  wherein the file download response message comprises a binary object associated with the identification of the file;

generating a symmetrical encryption key for use with a symmetrical encryption key algorithm in response to receiving a create key method call from the remote transfer client that includes a client public encryption key, wherein generating the symmetrical key comprises:
  calculating the symmetrical encryption key from the client public encryption key and a server private encryption key; and
  returning the server public key to the remote transfer client as a message encrypted using the predetermined symmetrical encryption algorithm and the client public encryption key;

wherein, each method call from the remote transfer client is packaged as a message sent over the Internet and encrypted using the predetermined symmetrical encryption algorithm and the symmetrical encryption key; and wherein, each response to the remote transfer client is packaged as a message sent over the Internet and encrypted using the predetermined symmetrical encryption algorithm and the symmetrical encryption key wherein, the symmetrical encryption key comprises both:
  a remainder of the server private encryption key raised to a power of the client public encryption key, divided by a predetermined prime integer; and
  a remainder of the client private encryption key raised to a power of the server public encryption key, divided by the predetermined prime integer; and wherein, the server private encryption key is an integer value generated by the webs services server;

wherein, the server public encryption key is the remainder of a predetermined generator value raised to the power of the server private encryption key, divided by the predetermined prime integer;

wherein, the client private encryption key is an integer value generated by the remote transfer client; and wherein, the client public encryption key is the remainder of the predetermined generator value raised to the power of the client private encryption key, divided by the predetermined prime integer.

\* \* \* \* \*